US012159639B2

(12) United States Patent
Norvell et al.

(10) Patent No.: US 12,159,639 B2
(45) **Date of Patent: *Dec. 3, 2024**

(54) POST-QUANTIZATION GAIN CORRECTION IN AUDIO CODING

(71) Applicant: Telefonaktiebolaget LM Ericsson (publ), Stockholm (SE)

(72) Inventors: Erik Norvell, Stockholm (SE); Volodya Grancharov, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 279 days.

This patent is subject to a terminal disclaimer.

(21) Appl. No.: 17/331,995

(22) Filed: May 27, 2021

(65) Prior Publication Data

US 2021/0287688 A1 Sep. 16, 2021

Related U.S. Application Data

(63) Continuation of application No. 16/565,920, filed on Sep. 10, 2019, now Pat. No. 11,056,125, which is a (Continued)

(51) Int. Cl.
*G10L 19/02* (2013.01)
*G10L 19/032* (2013.01)

(Continued)

(52) U.S. Cl.
CPC ............ *G10L 19/038* (2013.01); *G10L 19/02* (2013.01); *G10L 19/0204* (2013.01);

(Continued)

(58) Field of Classification Search
CPC ................ G10L 19/02; G10L 19/0204; G10L 19/032; G10L 19/038; G10L 19/0212
See application file for complete search history.

(56) References Cited

U.S. PATENT DOCUMENTS 5,109,417 A 4/1992 Fielder et al.
5,263,119 A 11/1993 Tanaka et al.

(Continued)

FOREIGN PATENT DOCUMENTS

EP 2159790 A1 3/2010
WO 2010042024 A1 4/2010
WO 2011048094 A1 4/2011

OTHER PUBLICATIONS

Mehrotra, S., Chen, W. G., Koishida, K., & Thumpudi, N. (Oct. 2008). Hybrid low bitrate audio coding using adaptive gain shape vector quantization. In 2008 IEEE 10th Workshop on Multimedia Signal Processing (pp. 927-932). IEEE.*

(Continued)

*Primary Examiner* — Bryan S Blankenagel
(74) *Attorney, Agent, or Firm* — Murphy, Bilak & Homiller, PLLC

(57) ABSTRACT

A gain adjustment apparatus for use in decoding of audio that has been encoded with separate gain and shape representations includes an accuracy meter configured to estimate an accuracy measure of the shape representation, and to determine a gain correction based on the estimated accuracy measure. An envelope adjuster further included in the apparatus is configured to adjust the gain representation based on the determined gain correction.

16 Claims, 20 Drawing Sheets

Related U.S. Application Data continuation of application No. 15/668,766, filed on Aug. 4, 2017, now Pat. No. 10,460,739, which is a continuation of application No. 14/002,509, filed as application No. PCT/SE2011/050899 on Jul. 4, 2011, now Pat. No. 10,121,481.

(51) Int. Cl.
*G10L 19/038* (2013.01)
*G10L 19/083* (2013.01)
*G10L 21/0232* (2013.01)

(52) U.S. Cl.
CPC .......... *G10L 19/032* (2013.01); *G10L 19/083* (2013.01); *G10L 21/0232* (2013.01)

(56) References Cited

U.S. PATENT DOCUMENTS

| | | | |
|---|---|---|---|
| 6,223,157 B1 | 4/2001 | Fisher et al. | |
| 6,496,798 B1 | 12/2002 | Huang et al. | |
| 6,611,800 B1 | 8/2003 | Nishiguchi et al. | |
| 6,615,169 B1 | 9/2003 | Ojala et al. | |
| 6,691,092 B1 | 2/2004 | Udaya Bhaskar et al. | |
| 7,447,631 B2 | 11/2008 | Truman et al. | |
| 7,454,330 B1 | 11/2008 | Nishiguchi et al. | |
| 7,577,570 B2 | 8/2009 | Kjoerling et al. | |
| 7,864,967 B2 | 1/2011 | Takeuchi et al. | |
| 2002/0007273 A1 | 1/2002 | Chen | |
| 2003/0004711 A1 | 1/2003 | Koishida et al. | |
| 2003/0009325 A1 | 1/2003 | Kirchherr et al. | |
| 2003/0115042 A1 | 6/2003 | Chen et al. | |
| 2005/0091051 A1 | 4/2005 | Moriya et al. | |
| 2005/0238096 A1 | 10/2005 | Holcomb et al. | |
| 2005/0261893 A1 | 11/2005 | Toyama et al. | |
| 2006/0020450 A1 | 1/2006 | Miseki | |
| 2007/0219785 A1 | 9/2007 | Gao | |
| 2008/0013751 A1 | 1/2008 | Hiselius | |
| 2009/0042526 A1 | 2/2009 | Maulik et al. | |
| 2009/0210219 A1 | 8/2009 | Sung et al. | |
| 2009/0225980 A1 | 9/2009 | Schmidt et al. | |
| 2009/0240491 A1 | 9/2009 | Reznik | |
| 2009/0259478 A1 | 10/2009 | Nomura et al. | |
| 2010/0017198 A1 | 1/2010 | Yamanashi et al. | |
| 2010/0017204 A1* | 1/2010 | Oshikiri .................. | G10L 19/24 704/E19.001 |
| 2010/0049512 A1 | 2/2010 | Oshikiri et al. | |
| 2011/0002266 A1 | 1/2011 | Gao | |
| 2011/0035214 A1 | 2/2011 | Morii | |
| 2011/0145003 A1 | 6/2011 | Bessette | |
| 2011/0291756 A1 | 12/2011 | Rofougaran | |
| 2012/0046955 A1 | 2/2012 | Rajendran et al. | |
| 2013/0013321 A1* | 1/2013 | Oh ........................ | G10L 21/038 704/500 |
| 2013/0317811 A1 | 11/2013 | Grancharov et al. | |
| 2013/0339010 A1* | 12/2013 | Kikuiri ............... | G10L 21/0388 704/203 |

OTHER PUBLICATIONS

Maitre, Xavier, "7 kHz Audio Coding Within 64 kbit/s", Maitre, X., "7 kHz Audio Coding Within 64 kbit/s," IEEE Journal on Selected Areas in Communications, Feb. 1988, pp. 283-298, vol. 6. No. 2.
Mittal, et al., "Low Complexity Factorial Pulse Coding of MDCT Coefficients Using Approximation of Combinatorial Functions", Mittal, U. et al., "Low Complexity Pulse Coding of MDCT Coefficient Using Approximation of Combinatorial Functions," Acoustics, Speech and Signal Processing, 2007, ICASSP 2007, IEEE International Conference, Apr. 15-20, 2007, pp. I-289-I292, vol. 1, Honol.
Murashima, Atsushi, et al., "A Post-Processing Technique to Improve Coding Quality of Celp Under Background Noise", IEEE Workshop, Speech Coding, 2000, Proceedings, 2000, Piscataway, NJ, USA, Sep. 17-20, 2000, pp. 102-104.
"Frame error robust narrow-band and wideband embedded variable bit-rate coding of speech and audio from 8-32 kbit/s", ITU-T, Telecommunication Standardization Sector of ITU, Series G: Transmission Systems and Media, Digital Systems and Networks, Digital Terminal Equipments—Coding of voice and audio signals, G.718, Geneva, CH, Jun. 1, 2008, pp. 1-257.
"G.729-Based Embedded Variable Bit-Rate Coder: An 8-32 kbit/s Scalable Wideband Coder Bitstream Interoperable with G.729", ITU-T G.729.1, Telecommunication Standardization Sector of ITU, Series G: Transmission Systems and Media, Digital Systems and Networks, Digital terminal equipments—Coding of analogue signals by methods other than PCM, May 2006, pp. 1-100.
Xie, Minjie, et al., "ITU-T G.722.1 Annex C: A New Low-Complexity 14 KHZ Audio Coding Standard", Xie, M. et al., "ITU-T G.722.1 Annex C: A New Low-Complexity 14 KHZ Audio Coding Standard" 2006 IEEE International Conference on Acoustics, Speech and Signal Processing, 2006, ICASSP 2006, May 14-19, 2006, pp. 1-21, vol. 5, Toulouse., May 14, 2006.
Xie, Minjie, et al., "TU-T G. 719: A new low-complexity full-band (20 kHz) audio coding standard for high-quality conversational applications", Xie, M. et al., "ITU-T G. 719: A new low-complexity full-band (20 kHz) audio coding standard for high-quality conversational applications" 2009 IEEE Workshop on Applications of Signal Processing to Audio and Acoustics, WASPA 2009, Oct. 18-21, 2009, pp., Oct. 18, 2009.

* cited by examiner

POST-QUANTIZATION GAIN CORRECTION IN AUDIO CODING

RELATED APPLICATIONS

This application is a continuation of U.S. application Ser. No. 16/565,920 filed 10 Sep. 2019, which is a continuation of U.S. application Ser. No. 15/668,766 filed 4 Aug. 2017, now U.S. Pat. No. 10,460,739, which is a continuation of U.S. application Ser. No. 14/002,509 filed 30 Aug. 2013, now U.S. Pat. No. 10,121,481, which is a U.S. National Phase Application of PCT/SE2011/050899 filed 4 Jul. 2011, which claims benefit of U.S. Provisional Application No. 61/449,230 filed 4 Mar. 2011. The entire contents of each aforementioned application is incorporated herein by reference.

TECHNICAL FIELD

The present technology relates to gain correction in audio coding based on quantization schemes where the quantization is divided into a gain representation and a shape representation, so called gain-shape audio coding, and especially to post-quantization gain correction.

BACKGROUND

Modern telecommunication services are expected to handle many different types of audio signals. While the main audio content is speech signals, there is a desire to handle more general signals such as music and mixtures of music and speech. Although the capacity in telecommunication networks is continuously increasing, it is still of great interest to limit the required bandwidth per communication channel. In mobile networks, smaller transmission bandwidths for each call yields lower power consumption in both the mobile device and the base station. This translates to energy and cost saving for the mobile operator, while the end user will experience prolonged battery life and increased talk-time. Further, with less consumed bandwidth per user, the mobile network can service a larger number of users in parallel.

Today, the dominating compression technology for mobile voice services is CELP (Code Excited Linear Prediction), which achieves good audio quality for speech at low bandwidths. It is widely used in deployed codecs such as AMR (Adaptive MultiRate). AMR-WB (Adaptive MultiRate WideBand) and GSM-EFR (Global System for Mobile communications-Enhanced FullRate). However, for general audio signals such as music the CELP technology has poor performance. These signals can often be better represented by using frequency transform based coding, for example, the ITU-T codecs G.722.1 [1] and G.719 [2]. However, transform domain codecs generally operate at a higher bitrate than the speech codecs. There is a gap between the speech and general audio domains in terms of coding, and it is desirable to increase the performance of transform domain codecs at lower bitrates.

Transform domain codecs require a compact representation of the frequency domain transform coefficients. These representations often rely on vector quantization (VQ), where the coefficients are encoded in groups. Among the various methods for vector quantization is the gain-shape VQ. This approach applies normalization to the vectors before encoding the individual coefficients. The normalization factor and the normalized coefficients are referred to as the gain and the shape of the vector, which may be encoded separately. The gain-shape structure has many benefits. By dividing the gain and the shape, the codec can easily be adapted to varying source input levels by designing the gain quantizer. It is also beneficial from a perceptual perspective where the gain and shape may carry different importance in different frequency regions. Finally, the gain-shape division simplifies the quantizer design and makes it less complex in terms of memory and computational resources compared to an unconstrained vector quantizer. A functional overview of a gain-shape quantizer can be seen in FIG. 1.

If applied to a frequency domain spectrum, the gain-shape structure can be used to form a spectral envelope and fine structure representation. The sequence of gain values forms the envelope of the spectrum while the shape vectors give the spectral detail. From a perceptual perspective, it is beneficial to partition the spectrum using a non-uniform band structure which follows the frequency resolution of the human auditory system. This generally means that narrow bandwidths are used for low frequencies while larger bandwidths are used for high frequencies. The perceptual importance of the spectral fine structure varies with the frequency but is also dependent on the characteristics of the signal itself. Transform coders often employ an auditory model to determine the important parts of the fine structure and assign the available resources to the most important parts. The spectral envelope is often used as input to this auditory model. The shape encoder quantizes the shape vectors using the assigned bits. See FIG. 2 for an example of a transform based coding system with an auditory model.

Depending on the accuracy of the shape quantizer, the gain value used to reconstruct the vector may be more or less appropriate. Especially when the allocated bits are few, the gain value drifts away from the optimal value. One way to solve this is to encode a correcting factor which accounts for the gain mismatch after the shape quantization. Another solution is to encode the shape first and then compute the optimal gain factor given the quantized shape.

The solution to encode a gain correction factor after shape quantization may consume considerable bitrate. If the rate is already low, this means more bits have to be taken elsewhere and may perhaps reduce the available bitrate for the fine structure.

To encode the shape before encoding the gain is a better solution, but if the bitrate for the shape quantizer is decided from the quantized gain value, then the gain and shape quantization would depend on each other. An iterative solution could likely solve this co-dependency, but it could easily become too complex to run in real-time on a mobile device.

SUMMARY

An object is to obtain a gain adjustment in decoding of audio that has been encoded with separate gain and shape representations.

This object is achieved in accordance with the attached claims.

A first aspect involves a gain adjustment method that includes the following steps:

An accuracy measure of the shape representation is estimated.

A gain correction is determined based on the estimated accuracy measure.

The gain representation is adjusted based on the determined gain correction.

A second aspect involves a gain adjustment apparatus that includes:

An accuracy meter configured to estimate an accuracy measure of the shape representation and to determine a gain correction based on the estimated accuracy measure.

An envelope adjuster configured to adjust the gain representation based on the determined gain correction.

A third aspect involves a decoder including a gain adjustment apparatus in accordance with the second aspect.

A fourth aspect involves a network node including a decoder in accordance with the third aspect.

The proposed scheme for gain correction improves the perceived quality of a gain-shape audio coding system. The scheme has low computational complexity and does require few additional bits if any.

BRIEF DESCRIPTION OF THE DRAWINGS

The present technology, together with further objects and advantages thereof, may best be understood by making reference to the following description taken together with the accompanying drawings, in which.

DETAILED DESCRIPTION

In the following description the same reference designations will be used for elements performing the same or similar function.

Before the present technology is described in detail, gain-shape coding will be illustrated with reference to FIG. 1-3.

Figure 1:
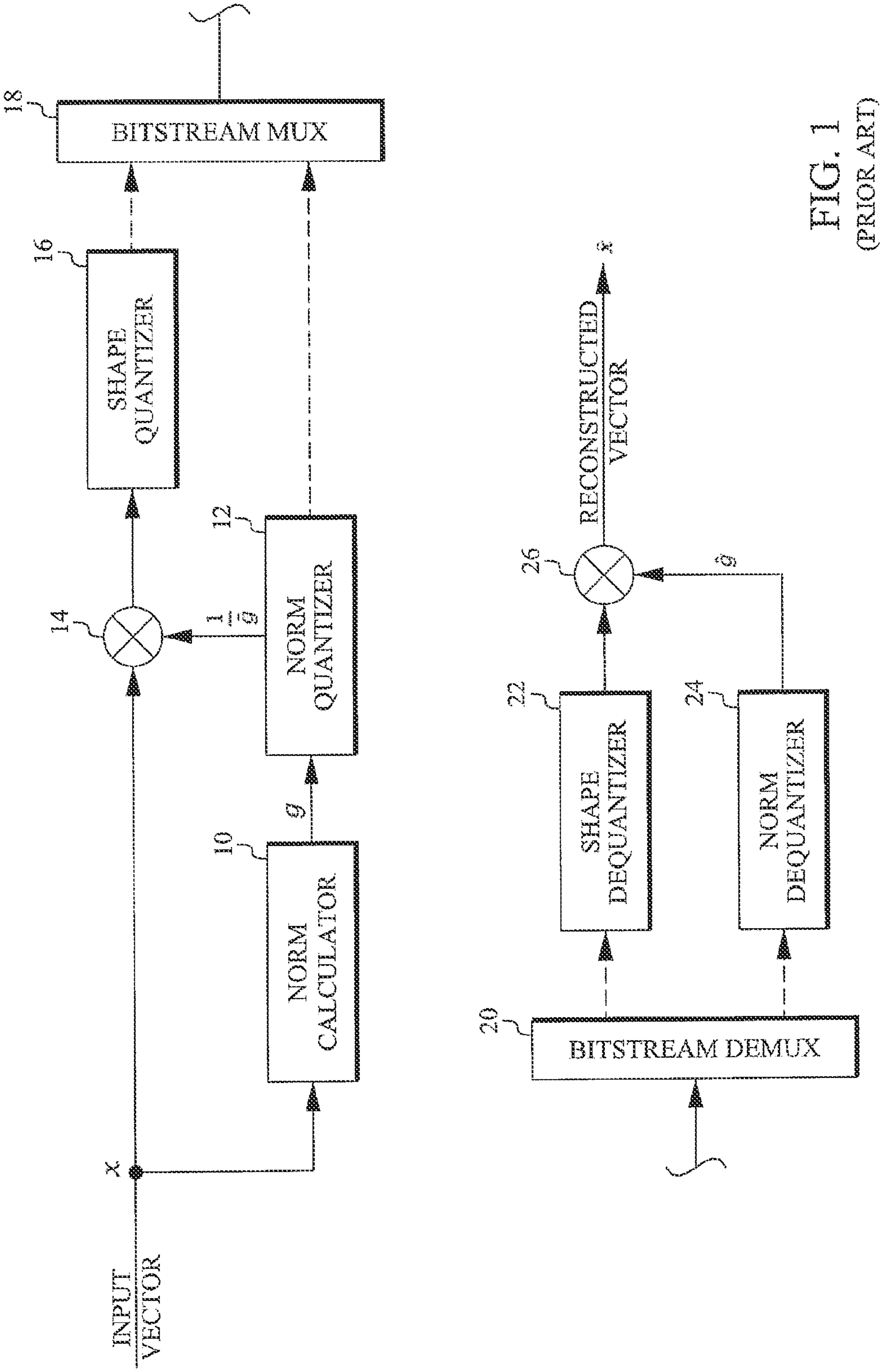
FIG. 1 (PRIOR ART)
FIG. 1 illustrates an example gain-shape vector quantization scheme.

FIG. 1 illustrates an example gain-shape vector quantization scheme. The upper part of the figure illustrates the encoder side. An input vector x is forwarded to a norm calculator 10, which determines the vector norm (gain) g, typically the Euclidian norm. This exact norm is quantized in a norm quantizer 12, and the inverse $1/\hat{g}$ of the quantized norm $\hat{g}$ is forwarded to a multiplier 14 for scaling the input vector x into a shape. The shape is quantized in a shape quantizer 16. Representations of the quantized gain and shape are forwarded to a bitstream multiplexer (mux) 18. These representations are illustrated by dashed lines to indicate that they may, for example, constitute indices into tables (code books) rather than the actual quantized values.

The lower part of FIG. 1 illustrates the decoder side. A bitstream demultiplexer (demux) 20 receives the gain and shape representations. The shape representation is forwarded to a shape dequantizer 22, and the gain representation is forwarded to a gain dequantizer 24. The obtained gain $\hat{g}$ is forwarded to a multiplier 26, where it scales the obtained shape, which gives the reconstructed vector $\hat{x}$.

Figure 2:
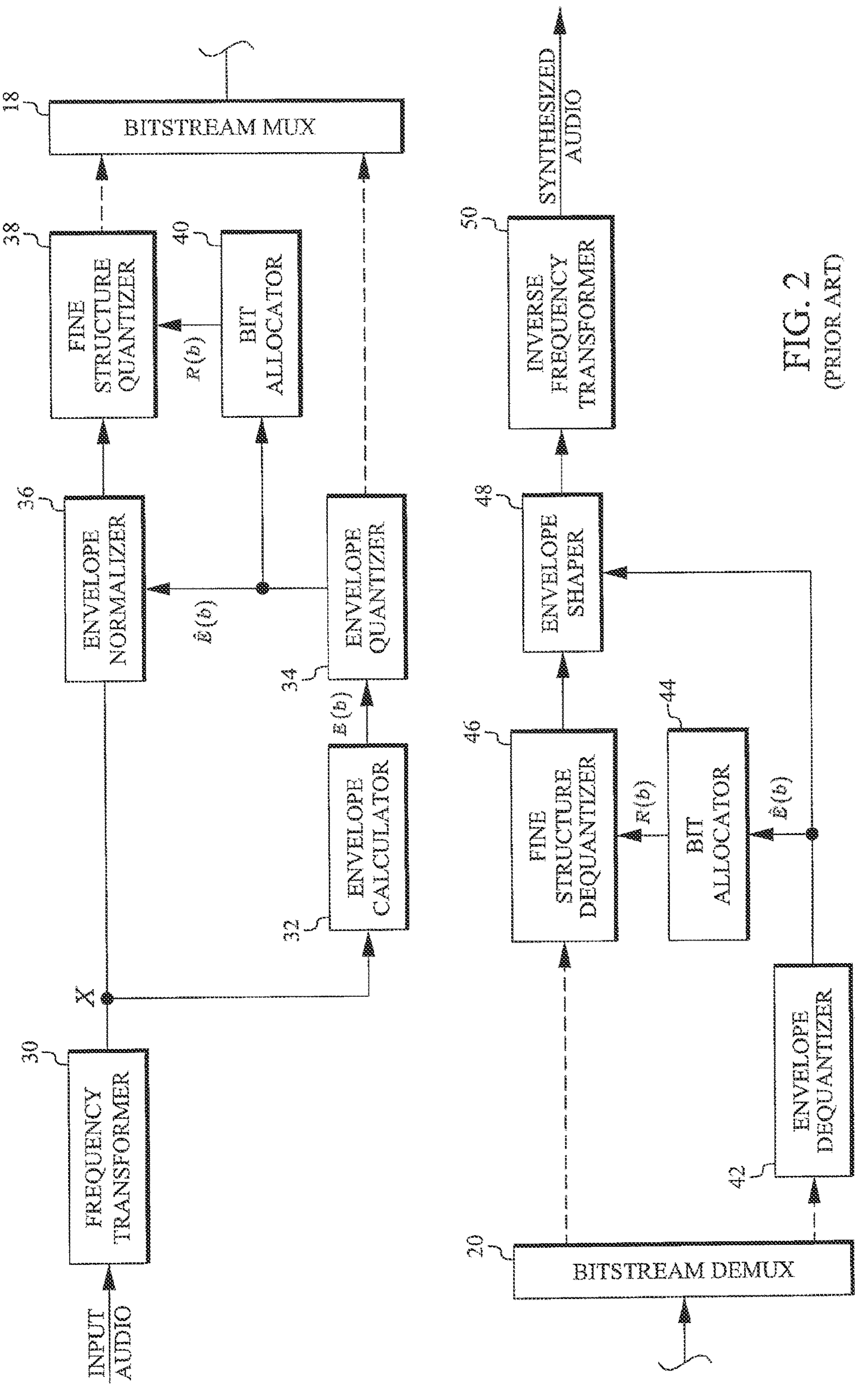
FIG. 2 (PRIOR ART)
FIG. 2 illustrates an example transform domain coding and decoding scheme.

FIG. 2 illustrates an example transform domain coding and decoding scheme. The upper part of the figure illustrates the encoder side. An input signal is forwarded to a frequency transformer 30, for example, based on the Modified Discrete Cosine Transform (MDCT), to produce the frequency transform X. The frequency transform X is forwarded to an envelope calculator 32, which determines the energy E(b) of each frequency band b. These energies are quantized into energies $\hat{E}(b)$ in an envelope quantizer 34. The quantized energies $\hat{E}(b)$ are forwarded to an envelope normalizer 36, which scales the coefficients of frequency band b of the transform X with the inverse of the corresponding quantized energy $\hat{E}(b)$ of the envelope. The resulting scaled shapes are forwarded to a fine structure quantizer 38. The quantized energies $\hat{E}(b)$ are also forwarded to a bit allocator 40, which allocates bits for fine structure quantization to each frequency band b. As noted above, the bit allocation R(b) may be based on a model of the human auditory system. Representations of the quantized gains $\hat{E}(b)$ and corresponding quantized shapes are forwarded to bitstream multiplexer 18.

The lower part of FIG. 2 illustrates the decoder side. The bitstream demultiplexer 20 receives the gain and shape representations. The gain representations are forwarded to an envelope dequantizer 42. The generated envelope energies $\hat{E}(b)$ are forwarded to a bit allocator 44, which determines the bit allocation R(b) of the received shapes. The shape representations are forwarded to a fine structure dequantizer 46, which is controlled by the bit allocation R(b). The decoded shapes are forwarded to an envelope shaper 48, which scales them with the corresponding envelope energies $\hat{E}(b)$ to form a reconstructed frequency transform. This transform is forwarded to an inverse frequency transformer 50, for example, based on the Inverse Modified Discrete Cosine Transform (IMDCT), which produces an output signal representing synthesized audio.

Figure 3A:
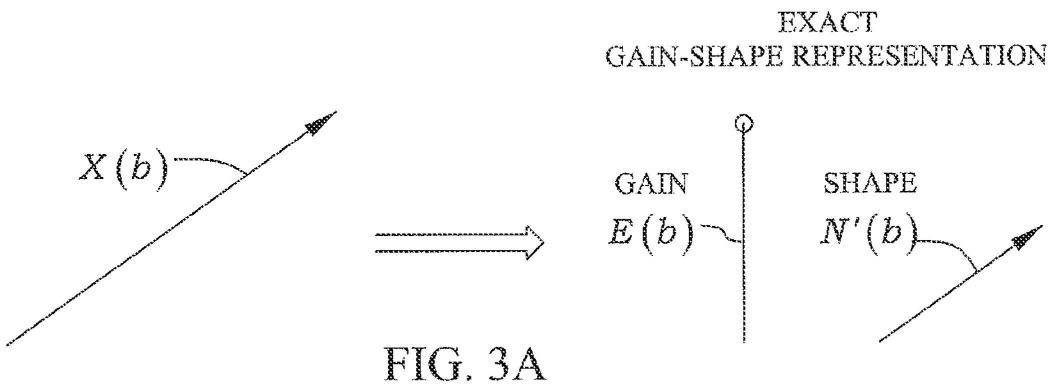
FIG. 3A-C illustrates gain-shape vector quantization in a simplified case.
Figure 3B:
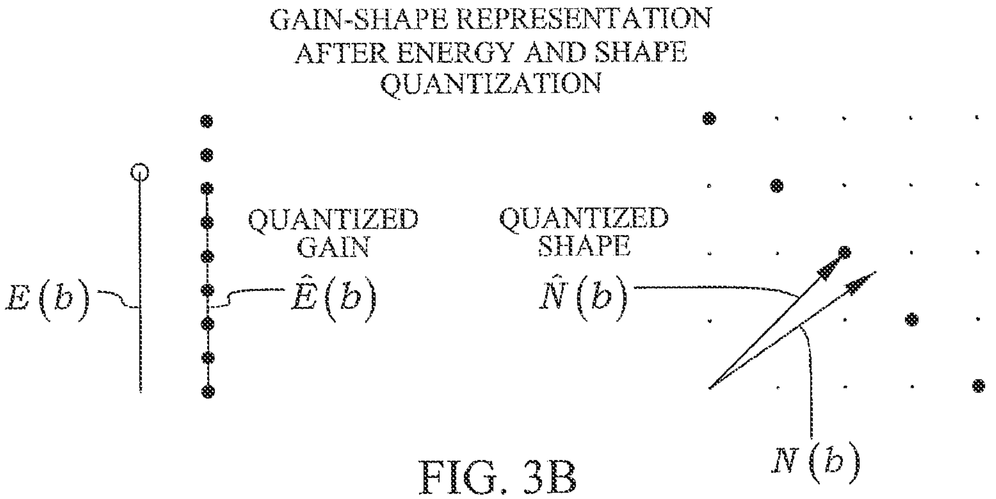
Figure 3C:
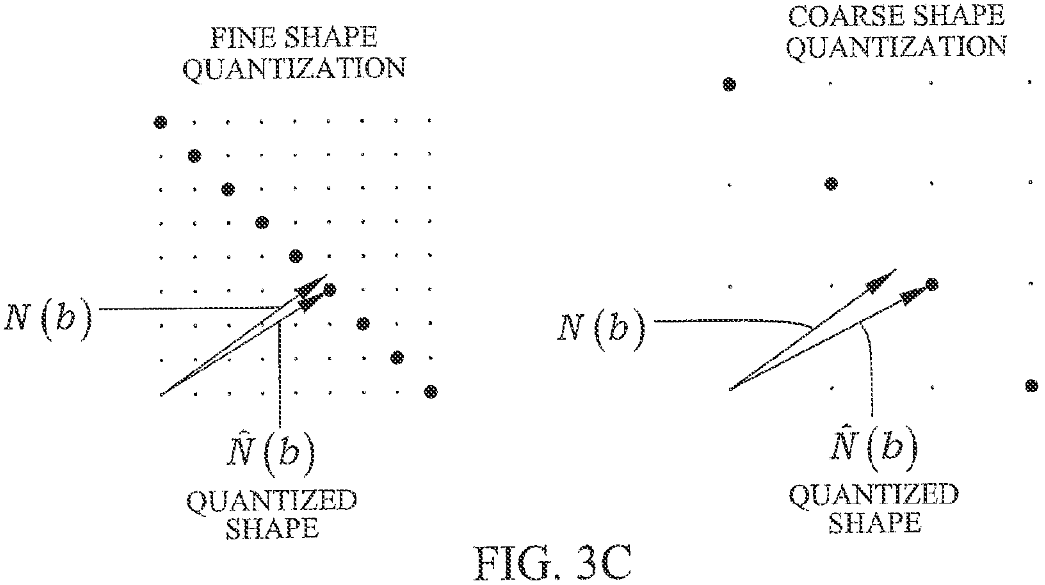

FIGS. 3A-C illustrates gain-shape vector quantization described above in a simplified case where the frequency band b is represented by the 2-dimensional vector X(b) in FIG. 3A. This case is simple enough to be illustrated in a drawing, but also general enough to illustrate the problem with gain-shape quantization (in practice the vectors typically have 8 or more dimensions). The right hand side of FIG. 3A illustrates an exact gain-shape representation of the vector X(b) with a gain E(b) and a shape (unit length vector) N'(b).

However, as illustrated in FIG. 3B, the exact gain E(b) is encoded into a quantized gain Ê(b) on the encoder side. Since the inverse of the quantized gain Ê(b) is used for scaling of the vector X(b), the resulting scaled vector N(b) will point in the correct direction, but will not necessarily be of unit length. During shape quantization, the scaled vector N(b) is quantized into the quantized shape N̂(b). In this case, the quantization is based on a pulse coding scheme [3], which constructs the shape (or direction) from a sum of signed integer pulses. The pulses may be added on top of each other for each dimension. This means that the allowed shape quantization positions are represented by the large dots in the rectangular grids illustrated in FIGS. 3B-C. The result is that the quantized shape N̂(b) will in general not coincide with the shape (direction) of N(b) (and N'(b)).

FIG. 3C illustrates that the accuracy of the shape quantization depends on the allocated bits R(b), or equivalently the total number of pulses available for shape quantization. In the left part of FIG. 3C the shape quantization is based on 8 pulses, whereas the shape quantization in the right part uses only 3 pulses (the example in FIG. 3B uses 4 pulses).

Thus, it is appreciated that depending on the accuracy of the shape quantizer, the gain value Ê(b) used to reconstruct the vector X(b) on the decoder side may be more or less appropriate. In accordance with the present technology, a gain correction can be based on an accuracy measure of the quantized shape.

The accuracy measure used to correct the gain may be derived from parameters already available in the decoder, but it may also depend on additional parameters designated for the accuracy measure. Typically, the parameters would include the number of allocated bits for the shape vector and the shape vector itself, but it may also include the gain value associated with the shape vector and pre-stored statistics about the signals that are typical for the encoding and decoding system. An overview of a system incorporating an accuracy measure and gain correction or adjustment is shown in FIG. 4.

Figure 4:
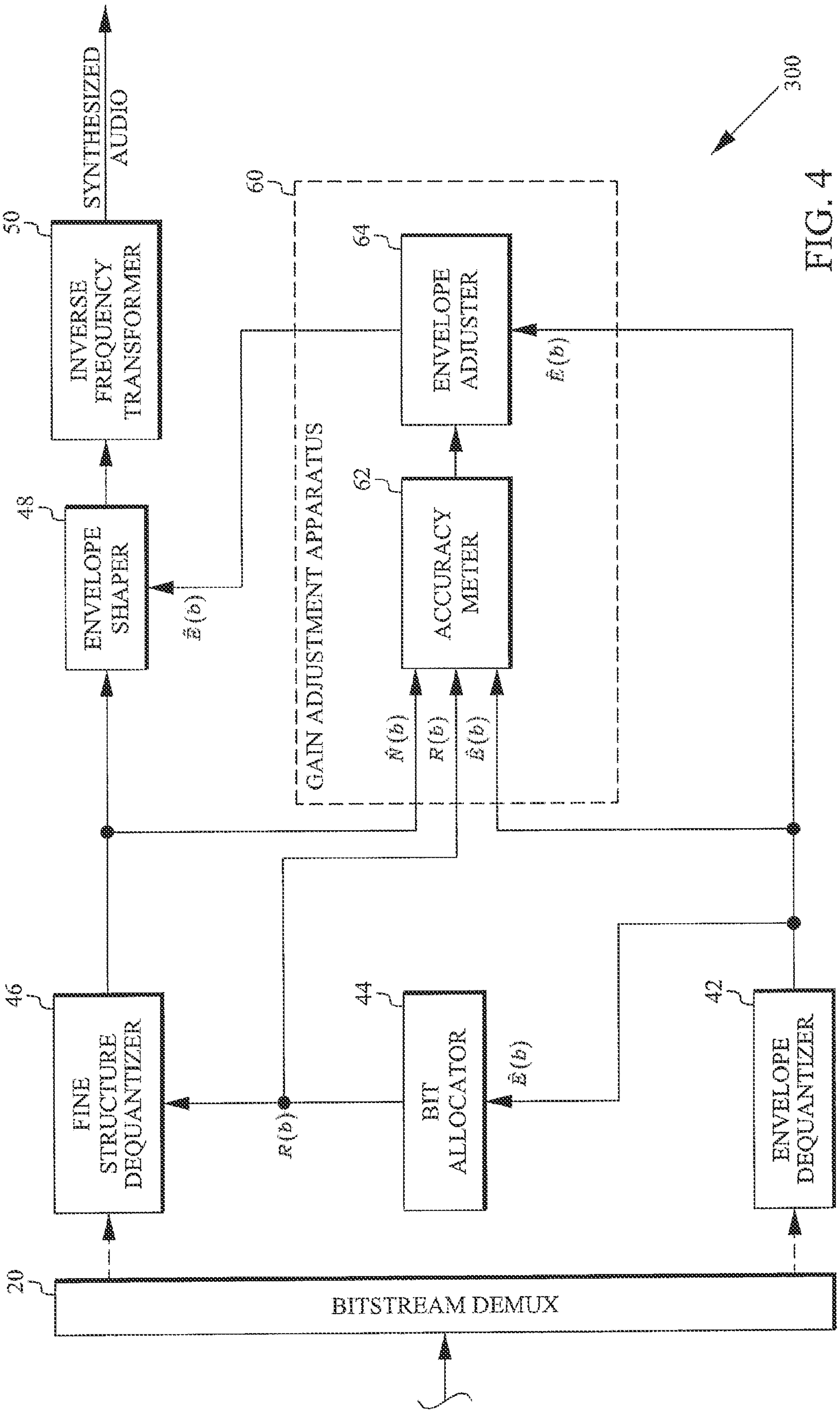
FIG. 4 illustrates an example transform domain decoder using an accuracy measure to determine an envelope correction.

FIG. 4 illustrates an example transform domain decoder 300 using an accuracy measure to determine an envelope correction. In order to avoid cluttering of the drawing, only the decoder side is illustrated. The encoder side may be implemented as in FIG. 2. The new feature is a gain adjustment apparatus 60. The gain adjustment apparatus 60 includes an accuracy meter 62 configured to estimate an accuracy measure A(b) of the shape representation N̂(b), and to determine a gain correction $g_C(b)$ based on the estimated accuracy measure A(b). It also includes an envelope adjuster 64 configured to adjust the gain representation Ê(b) based on the determined gain correction.

As indicated above, the gain correction may in some embodiments be performed without spending additional bits. This is done by estimating the gain correction from parameters already available in the decoder. This process can be described as an estimation of the accuracy of the encoded shape. Typically, this estimation includes deriving the accuracy measure A(b) from shape quantization characteristics indicating the resolution of the shape quantization.

Embodiment 1

In one embodiment, the present technology is used in an audio encoder/decoder system. The system is transform based and the transform used is the Modified Discrete Cosine Transform (MDCT) using sinusoidal windows with 50% overlap. However, it is understood that any transform suitable for transform coding may be used together with appropriate segmentation and windowing.

Encoder of Embodiment 1

The input audio is extracted into frames using 50% overlap and windowed with a symmetric sinusoidal window. Each windowed frame is then transformed to an MDCT spectrum X. The spectrum is partitioned into subbands for processing, where the subband widths are non-uniform. The spectral coefficients of frame m belonging to band b are denoted X(b,m) and have the bandwidth BW(b). Since most encoder and decoder steps can be described within one frame, we omit the frame index and just use the notation X(b). The bandwidths should preferably increase with increasing frequency to comply with the frequency resolution of the human auditory system. The root-mean-square (RMS) value of each band is used as a normalization factor and is denoted E(b):

$$E(b) = \sqrt{\frac{X(b)^T X(b)}{BW(b)}} \tag{1}$$

where $X(b)^T$ denotes the transpose of X(b).

The RMS value can be seen as the energy value per coefficient. The sequence of normalization factors E(b) for b=1, 2, . . . , $N_{bands}$ forms the envelope of the MDCT spectrum, where $N_{bands}$ denotes the number of bands. Next, the sequence is quantized in order to be transmitted to the decoder. To ensure that the normalization can be reversed in the decoder, the quantized envelope Ê(b) is obtained. In this example embodiment the envelope coefficients are scalar quantized in log domain using a step size of 3 dB and the quantizer indices are differentially encoded using Huffman coding. The quantized envelope is used for normalization of the spectral bands, i.e.:

$$N(b) = \frac{1}{\hat{E}(b)} X(b) \tag{2}$$

Note that if the non-quantized envelope E(b) is used for normalization, the shape would have RMS=1, i.e.:

$$N'(b) = \frac{1}{E(b)} X(b) \Rightarrow \sqrt{\frac{N'(b)^T N'(b)}{BW(b)}} = 1 \tag{3}$$

By using the quantized envelope Ê(b), the shape vector will have an RMS value close to 1. This feature will be used in the decoder to create an approximation of the gain value.

The union of the normalized shape vectors N(b) forms the fine structure of the MDCT spectrum. The quantized envelope is used to produce a bit allocation R(b) for encoding of the normalized shape vectors N(b). The bit allocation algorithm preferably uses an auditory model to distribute the bits to the perceptually most relevant parts. Any quantizer scheme may be used for encoding the shape vector. Common for all is that they may be designed under the assumption that the input is normalized, which simplifies quantizer design. In this embodiment the shape quantization is done using a pulse coding scheme which constructs the synthesis shape from a sum of signed integer pulses [3]. The pulses may be added on top of each other to form pulses of different height. In this embodiment the bit allocation R(b) denotes the number of pulses assigned to band b.

The quantizer indices from the envelope quantization and shape quantization are multiplexed into a bitstream to be stored or transmitted to a decoder.

Decoder of Embodiment 1

The decoder demultiplexes the indices from the bitstream and forwards the relevant indices to each decoding module. First, the quantized envelope Ê(b) is obtained. Next, the fine structure bit allocation is derived from the quantized envelope using a bit allocation identical the one used in the encoder. The shape vectors N̂(b) of the fine structure are decoded using the indices and the obtained bit allocation R(b).

Now, before scaling the decoded fine structure with the envelope, additional gain correction factors are determined. First, the RMS matching gain is obtained as:

$$g_{RMS}(b)=\sqrt{\frac{BW(b)}{\hat{N}(b)^T\hat{N}(b)}} \tag{4}$$

The $g_{RMS}(b)$ factor is a scaling factor that normalizes the RMS value to 1, i.e.:

$$\sqrt{\frac{(g_{RMS}(b)\hat{N}(b))^T(g_{RMS}(b)\hat{N}(b))}{BW(b)}}=1 \tag{5}$$

In this embodiment we seek to minimize the mean squared error (MSE) of the synthesis:

$$g_{MSE}(b)=\arg\min_g|N(b)-g\cdot\hat{N}(b)| \tag{6}$$

with the solution $$g_{MSE}(b)=\frac{\hat{N}(b)^TN(b)}{N(b)^TN(b)} \tag{7}$$

Since $g_{MSE}(b)$ depends on the input shape N(b), it is not known in the decoder. In this embodiment the impact is estimated by using an accuracy measure. The ratio of these gains is defined as a gain correction factor $g_c(b)$:

$$g_c(b)=\frac{g_{MSE}(b)}{g_{RMS}(b)} \tag{8}$$

When the accuracy of the shape quantization is good, the correction factor is close to 1. i.e.:

$$\hat{N}(b)\rightarrow N(b)\Rightarrow g_c(b)\rightarrow 1 \tag{9}$$

Figure 5A:
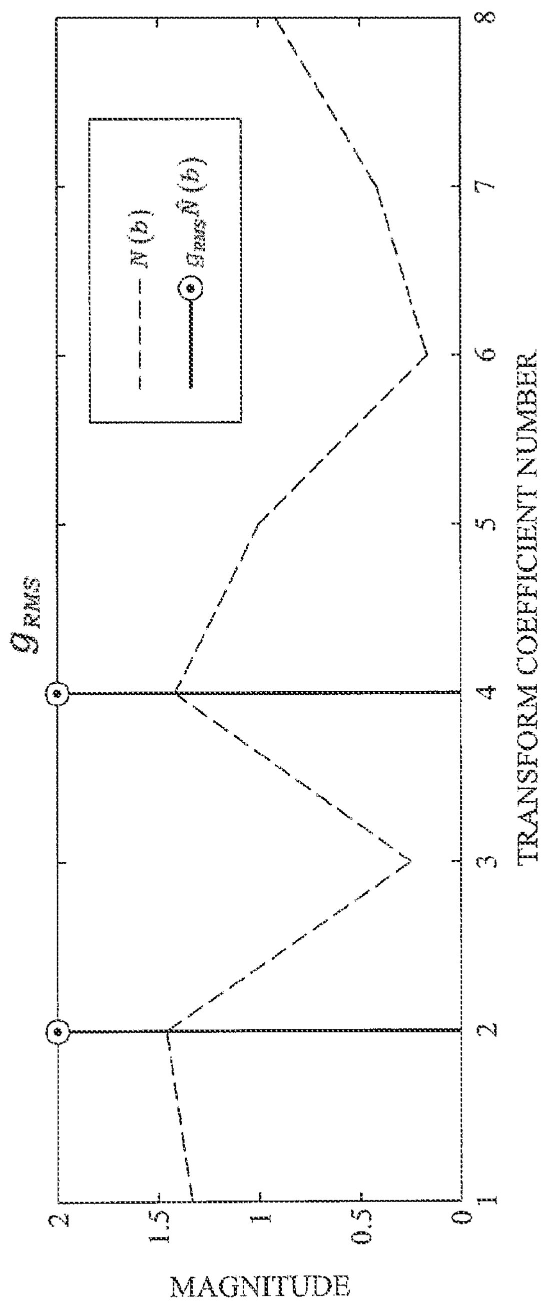
FIG. 5A-B illustrates an example result of scaling the synthesis with gain factors when the shape vector is a sparse pulse vector.
Figure 5B:
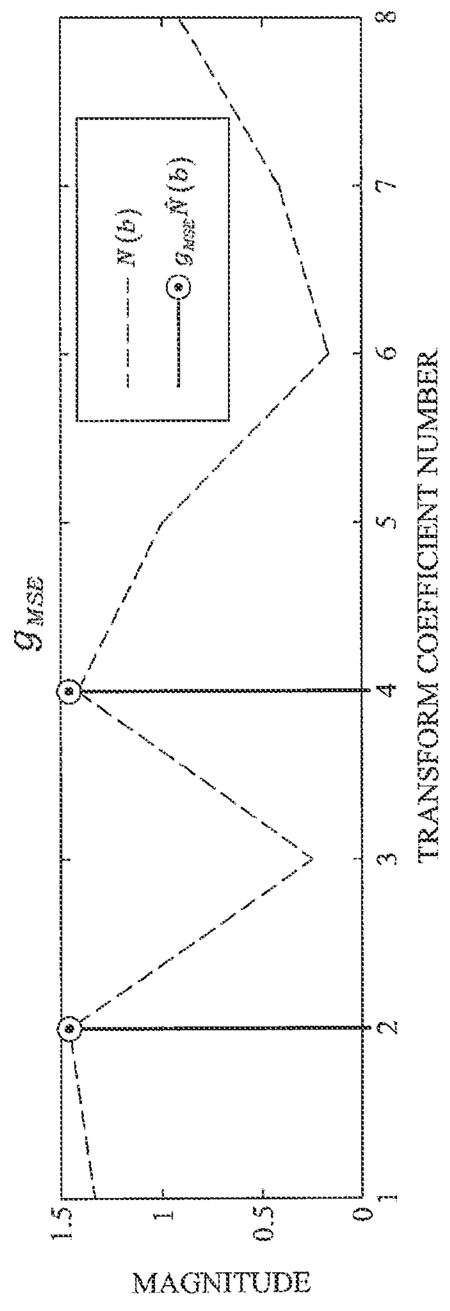

However, when the accuracy of N̂(b) is low, $g_{MSE}(b)$ and $g_{RMS}(b)$ will diverge. In this embodiment, where the shape is encoded using a pulse coding scheme, a low rate will make the shape vector sparse and $g_{RMS}(b)$ will give an overestimate of the appropriate gain in terms of MSE. For this case $g_c(b)$ should be lower than 1 to compensate for the overshoot. See FIG. 5A-B for an example illustration of the low rate pulse shape case. FIG. 5A-B illustrates an example of scaling the synthesis with $g_{MSE}$(FIG. 5B) and $g_{RMS}$(FIG. 5A) gain factors when the shape vector is a sparse pulse vector. The $g_{RMS}$ scaling gives pulses that are too high in an MSE sense.

On the other hand, a peaky or sparse target signal can be well represented with a pulse shape. While the sparseness of the input signal may not be known in the synthesis stage, the sparseness of the synthesis shape may serve as an indicator of the accuracy of the synthesized shape vector. One way to measure the sparseness of the synthesis shape is the height of the maximum peak in the shape. The reasoning behind this is that a sparse input signal is more likely to generate high peaks in the synthesis shape. See FIGS. 6A-B for an illustration of how the peak height can indicate the accuracy of two equal rate pulse vectors.

Figure 6A:
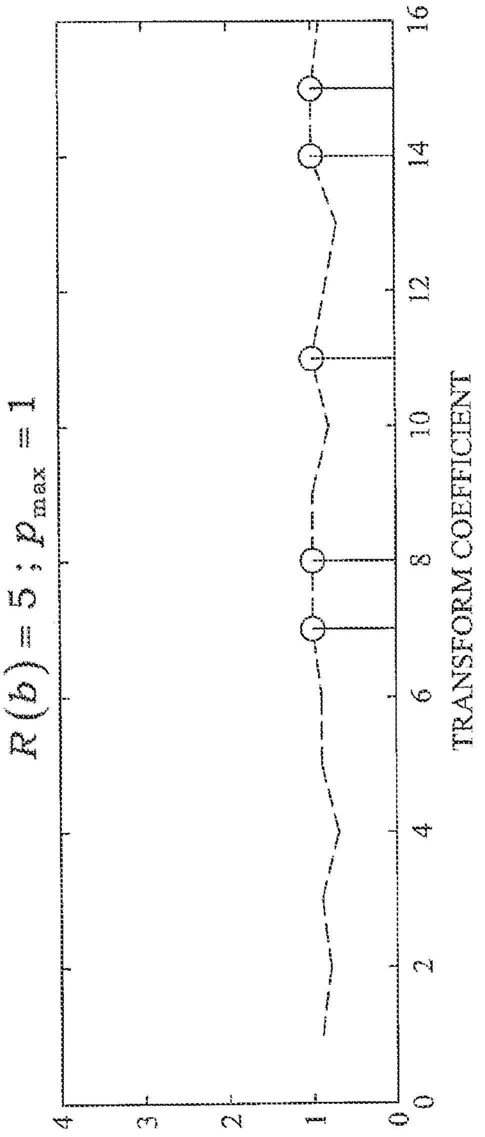
FIG. 6A-B illustrates how the largest pulse height can indicate the accuracy of the shape vector.
Figure 6B:
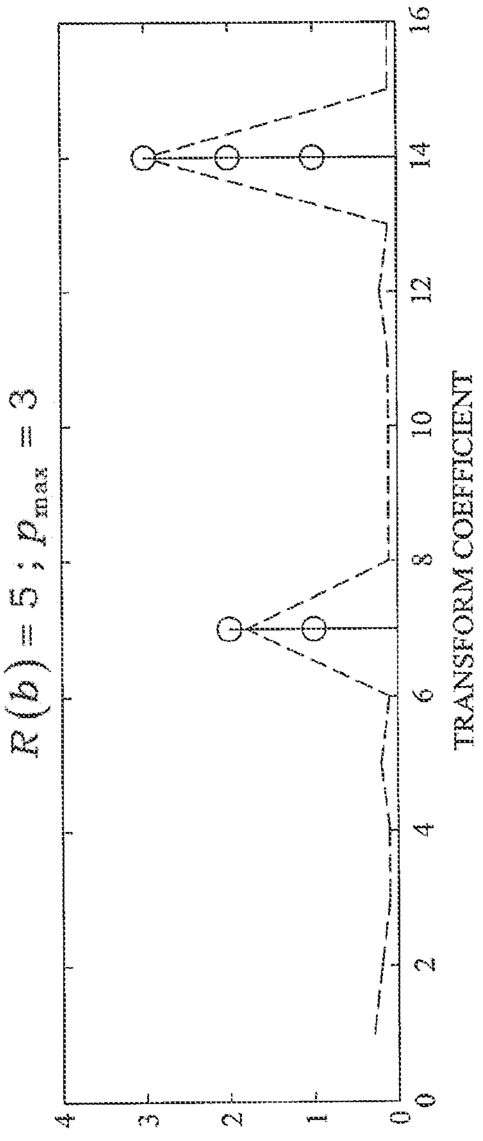

In FIG. 6A there are 5 pulses available (R(b)=5) to represent the dashed shape. Since the shape is rather constant, the coding generated 5 distributed pulses of equal height 1. i.e. $p_{max}=1$. In FIG. 6B there are also 5 pulses available to represent the dashed shape. However, in this case the shape is peaky or sparse, and the largest peak is represented by 3 pulses on top of each other. i.e. $p_{max}=3$. This indicates that the gain correction $g_C(b)$ depends on an estimated sparseness $p_{max}$ of the quantized shape.

As noted above, the input shape N(b) is not known by the decoder. Since $g_{MSE}(b)$ depends on the input shape N(b), this means that the gain correction or compensation $g_c(b)$ can in practice not be based on the ideal equation (8). In this embodiment the gain correction $g_c(b)$ is instead decided based on the bit-rate in terms of the number of pulses R(b), the height of the largest pulse in the shape vector $p_{max}(b)$ and the frequency band b, i.e.:

$$g_c(b)=f(R(b),p_{max}(b),b) \tag{10}$$

Figure 7:
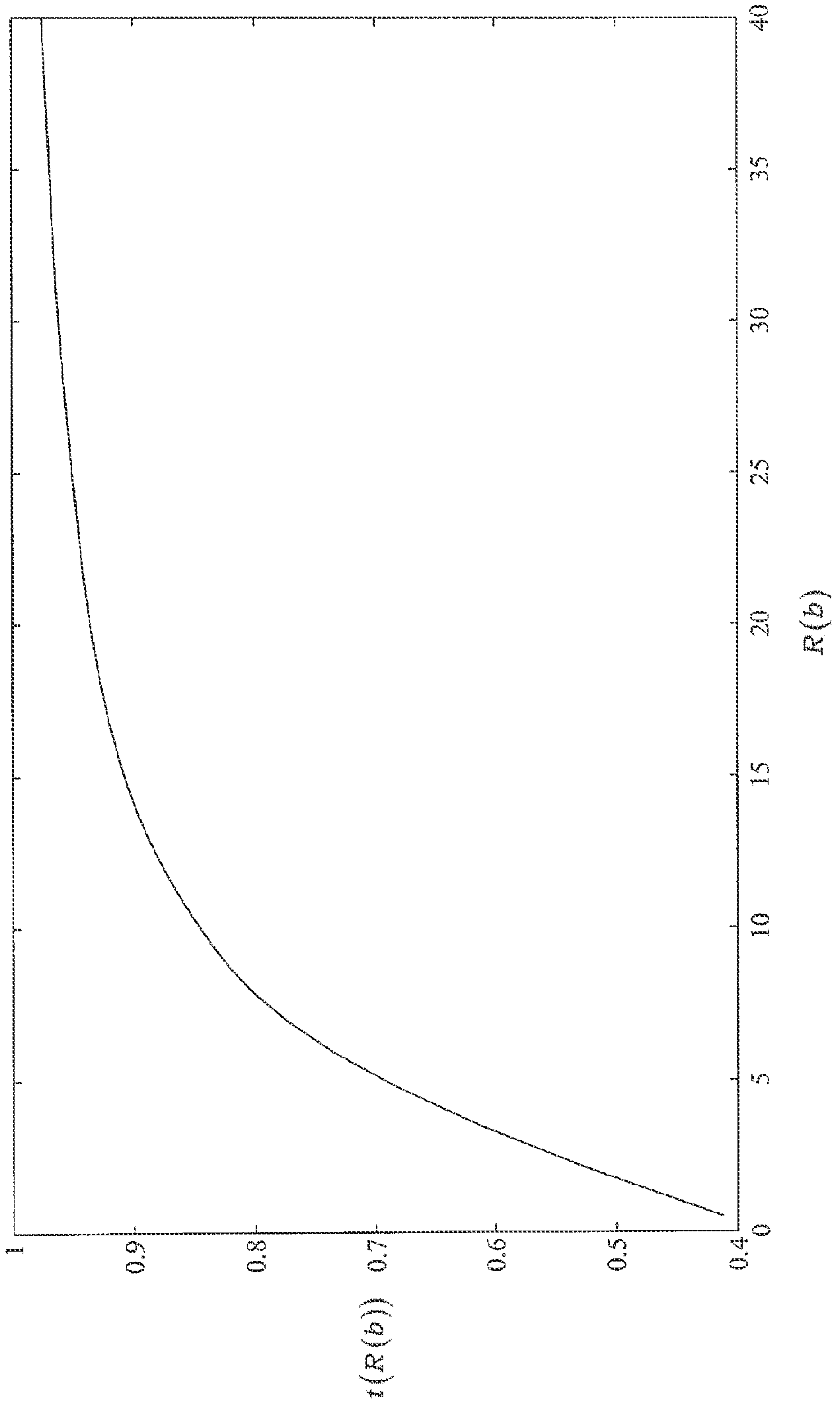
FIG. 7 illustrates an example of a rate based attenuation function for embodiment 1.

It has been observed that the lower rates generally require an attenuation of the gain to minimize the MSE. The rate dependency may be implemented as a lookup table t(R(b)) which is trained on relevant audio signal data. An example lookup table can be seen in FIG. 7. Since the shape vectors in this embodiment have different widths, the rate may preferably be expressed as number of pulses per sample. In this way the same rate dependent attenuation can be used for all bandwidths. An alternative solution, which is used in this embodiment, is to use a step size T in the table depending on the width of the band. Here, we use 4 different bandwidths in 4 different groups and hence require 4 step sizes. An example of step sizes is found in Table 1. Using the step size, the lookup value is obtained by using a rounding operation $t(\lfloor R(b)\cdot T\rceil)$, where $\lfloor\ \rceil$ represents rounding to the closest integer.

TABLE 1

| Band group | Bandwidth | Step size T |
|---|---|---|
| 1 | 8 | 4 |
| 2 | 16 | 4/3 |
| 3 | 24 | 2 |
| 4 | 34 | 1 |

Another example lookup table is given in Table 2.

TABLE 2

| Band group | Bandwidth | Step size T |
|---|---|---|
| 1 | 8 | 4 |
| 2 | 16 | 4/3 |
| 3 | 24 | 2 |
| 4 | 32 | 1 |

Figure 8:
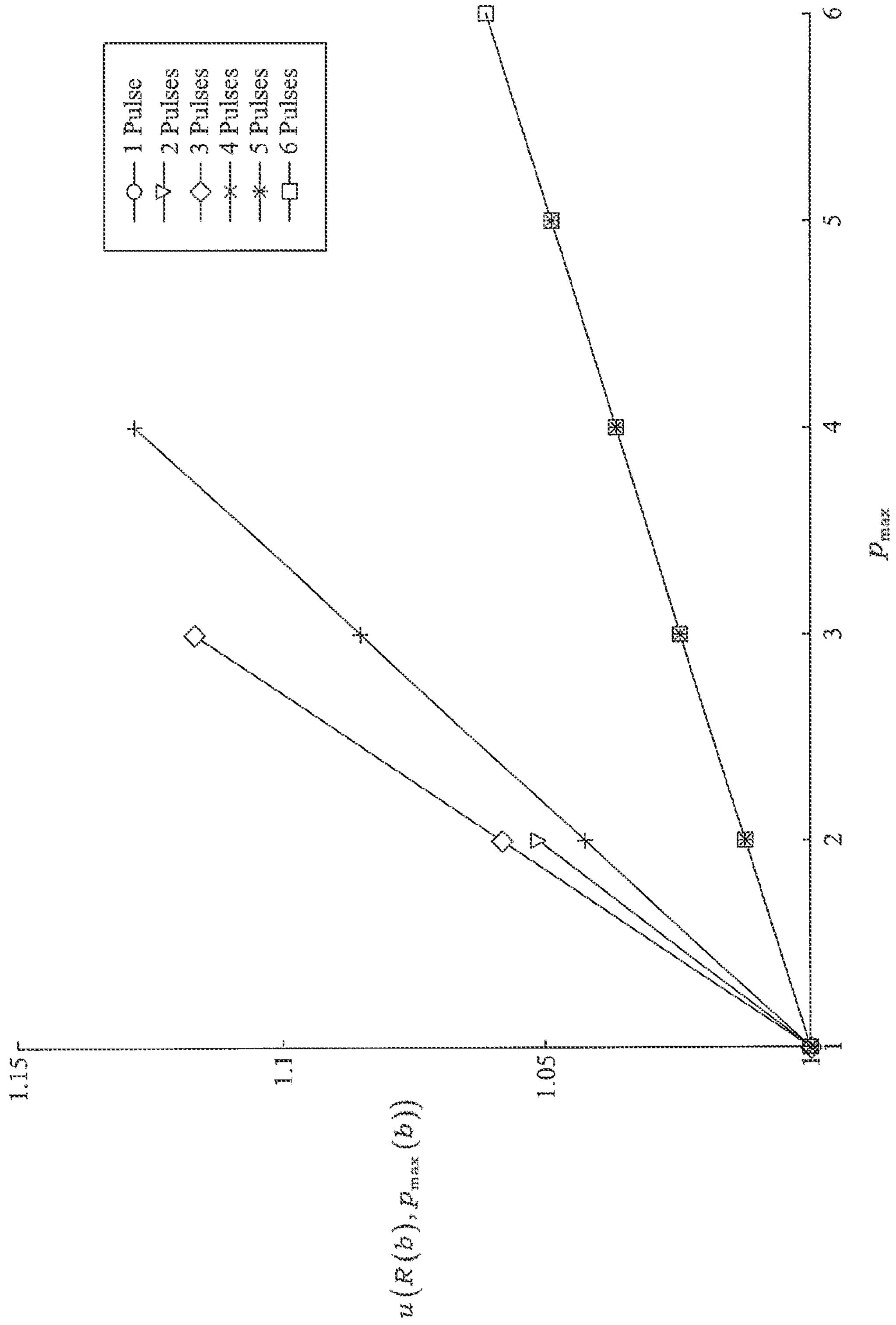
FIG. 8 illustrates an example of a rate and maximum pulse height dependent gain adjustment function for embodiment 1.

The estimated sparseness can be implemented as another lookup table $u(R(b), p_{max}(b))$ based on both the number of pulses $R(b)$ and the height of the maximum pulse $p_{max}(b)$. An example lookup table is shown in FIG. 8. The lookup table u serves as an accuracy measure $A(b)$ for band b, i.e.:

$$A(b)=u(R(b),p_{max}(b)) \quad (11)$$

It was noted that the approximation of $g_{MSE}$ was more suitable for the lower frequency range from a perceptual perspective. For the higher frequencies the fine structure becomes less perceptually important and the matching of the energy or RMS value becomes vital. For this reason, the gain attenuation may be applied only below a certain band number $b_{THR}$. In this case the gain correction $g_c(b)$ will have an explicit dependence on the frequency band b. The resulting gain correction function can in this case be defined as:

$$g_c(b) = \begin{cases} t(R(b)) \cdot A(b), & b < b_{THR} \\ 1, & \text{otherwise} \end{cases} \quad (12)$$

The description up to this point may also be used to describe the essential features of the example embodiment of FIG. 4. Thus, in the embodiment of FIG. 4, the final synthesis $\hat{X}(b)$ is calculated as:

$$\hat{X}(b) = \frac{g_c(b) g_{RMS}(b) \hat{E}(n) \hat{N}(b)}{\hat{E}(n)} \quad (13)$$

As an alternative the function $u(R(b), p_{max}(b))$ may be implemented as a linear function of the maximum pulse height $p_{max}$ and the allocated bit rate $R(b)$, for example as:

$$u(R(b),p_{max}(b))=k\cdot(p_{max}(b)-R(b))+1 \quad (14)$$

where the inclination k is determined by:

$$k = \frac{1-(a_{min}+R(b)\cdot\Delta a)}{R(b)-1} \quad (15)$$

$$\Delta a = (a_{max}-a_{min})/R(b)$$

$$a_{max} = 1 - \frac{1-a_{min}}{R(b)-1}$$

Figure 9:
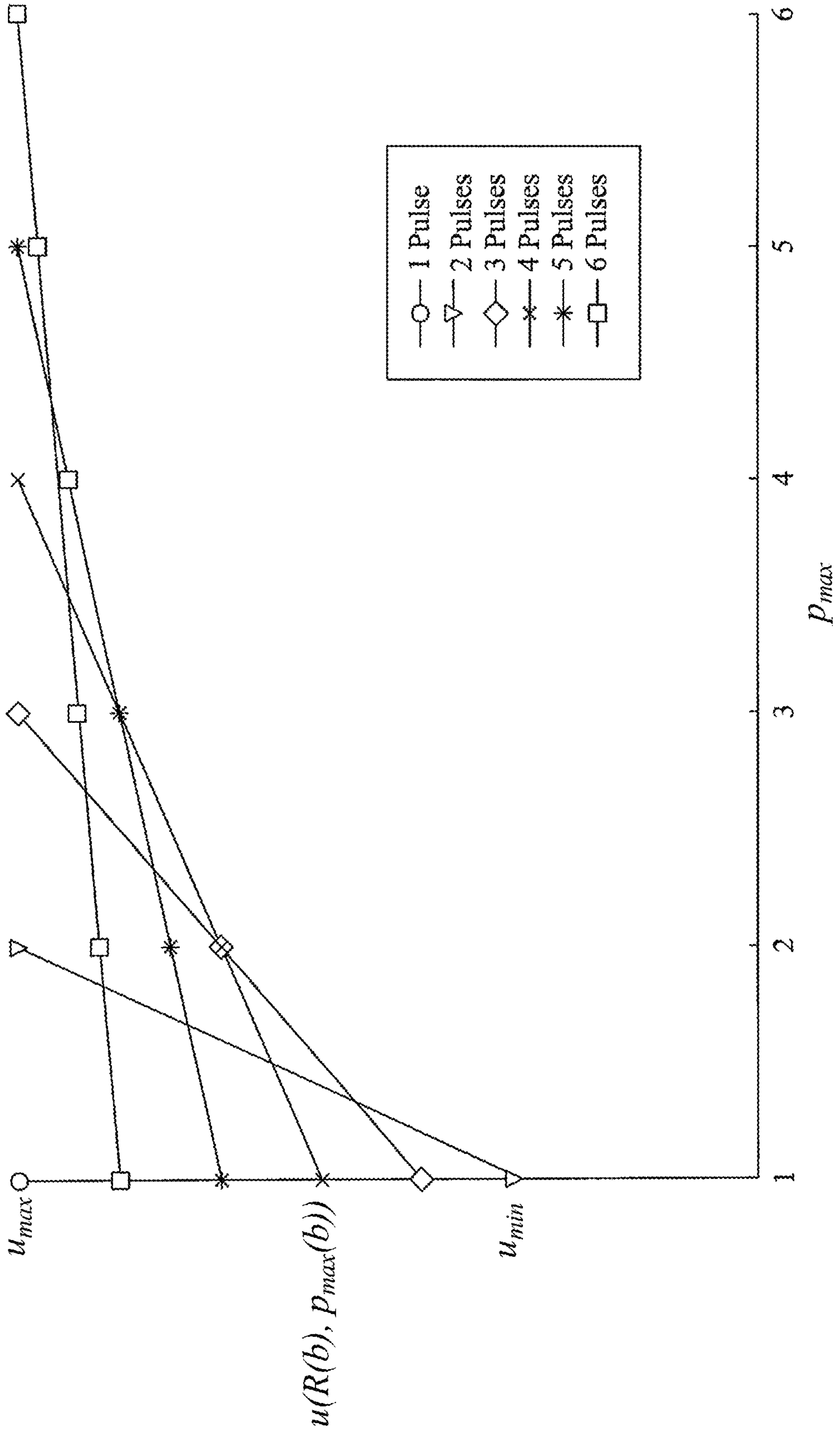
FIG. 9 illustrates another example of a rate and maximum pulse height dependent gain adjustment function for embodiment 1.

The function depends on the tuning parameter $a_{min}$ which gives the initial attenuation factor for $R(b)=1$ and $p_{max}(b)=1$. The function is illustrated in FIG. 9, with the tuning parameter $a_{min}=0.41$. Typically $u_{max}\in[0.7,1.4]$ and $u_{min}\in[0, u_{max}]$. In equation (14) u is linear in the difference between $p_{max}(b)$ and $R(b)$. Another possibility is to have different inclination factors for $p_{max}(b)$ and $R(b)$.

The bitrate for a given band may change drastically for a given band between adjacent frames. This may lead to fast variations of the gain correction. Such variations are especially critical when the envelope is fairly stable, i.e. the total changes between frames are quite small. This often happens for music signals which typically have more stable energy envelopes. To avoid that the gain attenuation introduces instability, an additional adaptation may be added. An overview of such an embodiment is given in FIG. 10, in which a stability meter 66 has been added to the gain adjustment apparatus 60 in the decoder 300.

The adaptation can, for example, be based on a stability measure of the envelope $\hat{E}(b)$. An example of such a measure is to compute the squared Euclidian distance between adjacent $\log_2$ envelope vectors:

$$\Delta E(m) = \frac{1}{N_{bands}} \sum_{b=0}^{N_{bands}-1} \left(\log_2\hat{E}(b, m) - \log_2\hat{E}(b, m-1)\right)^2 \quad (16)$$

Here. $\Delta E(m)$ denotes the squared Euclidian distance between the envelope vectors for frame in and frame m−1. The stability measure may also be lowpass filtered to have a smoother adaptation:

$$\Delta\tilde{E}(m)=\alpha\Delta E(m)+(1-\alpha)\Delta E(m-1) \quad (17)$$

A suitable value for the forgetting factor $\alpha$ may be 0.1. The smoothened stability measure may then be used to create a limitation of the attenuation using, for example, a sigmoid function such as:

$$g_{min} = \frac{1}{1+e^{C_1(\Delta\tilde{E}(m)-C_2)-C_3}}, \quad (18)$$

where the parameters may be set to $C_1=6$, $C_2=2$ and $C_3=1.9$. It should be noted that these parameters are to be seen as examples, while the actual values may be chosen with more freedom. For instance:

$$C_1\in[1,10]$$

$$C_2\in[1,4]$$

$$C_3\in[-5,10]$$

Figure 11:
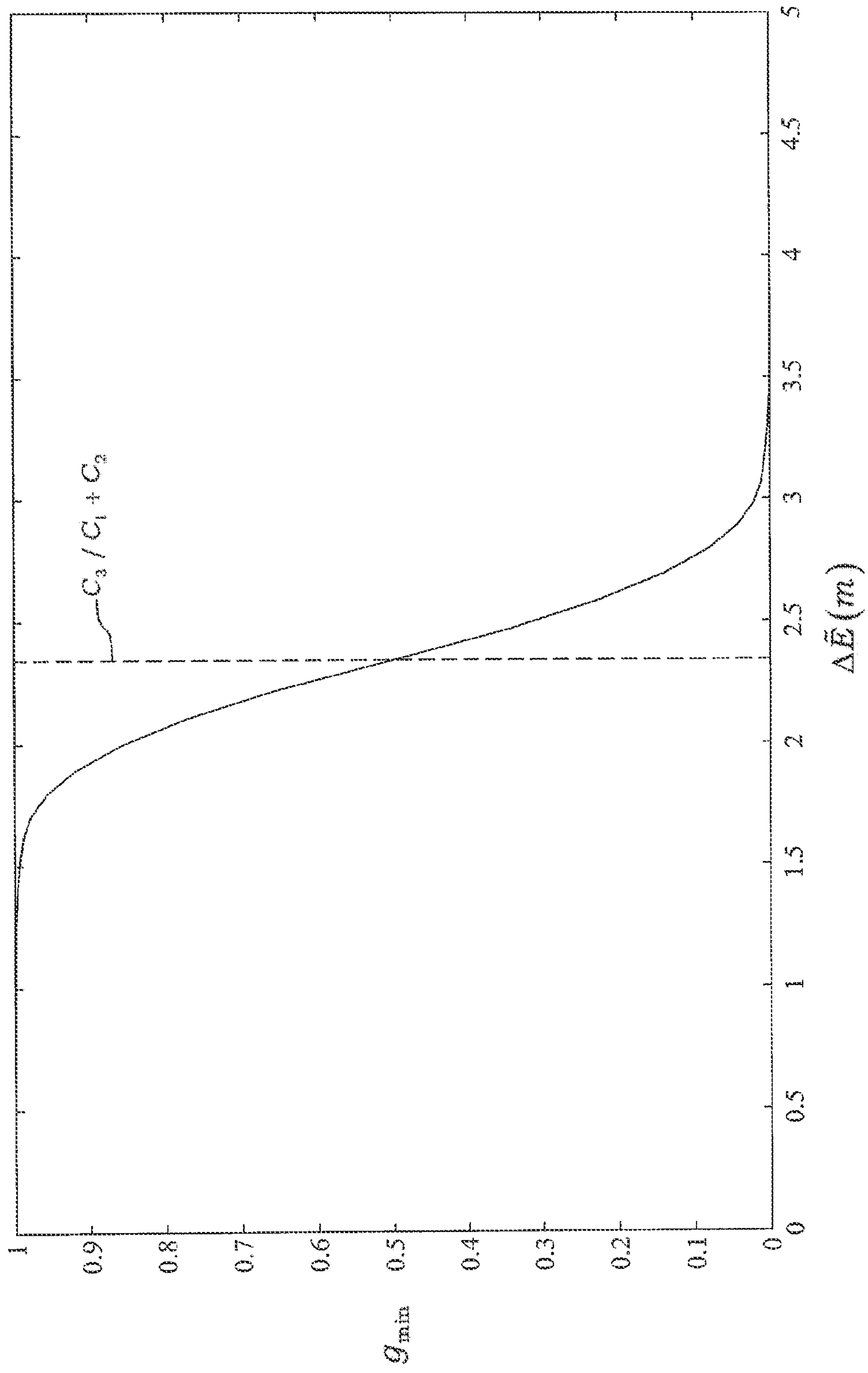
FIG. 11 illustrates an example of a mapping function from the stability measure to the gain adjustment limitation factor.

FIG. 11 illustrates an example of a mapping function from the stability measure $\Delta\tilde{E}(m)$ to the gain adjustment limitation factor $g_{min}$. The above expression for $g_{min}$ is preferably implemented as a lookup table or with a simple step function, such as:

$$g_{min} = \begin{cases} 1, & \Delta\tilde{E}(m) < C_3/C_1 + C_2 \\ 0, & \Delta\tilde{E}(m) \geq C_3/C_1 + C_2 \end{cases} \quad (19)$$

The attenuation limitation variable $g_{min}\in[0,1]$ may be used to create a stability adapted gain modification $\tilde{g}_c(b)$ as:

$$\tilde{g}_c(b)=\max(g_c(b),g_{min}) \quad (20)$$

After the estimation of the gain, the final synthesis X̂(b) is calculated as:

$$\hat{X}(b) = \frac{g_c(b) g_{RMS}(b) \hat{E}(n) \hat{N}(b)}{E(n)} \tag{21}$$

In the described variations of embodiment 1 the union of the synthesized vectors X̂(b) forms the synthesized spectrum X̂, which is further processed using the inverse MDCT transform, windowed with the symmetric sine window and added to the output synthesis using the overlap-and-add strategy.

Embodiment 2

Figure 12:
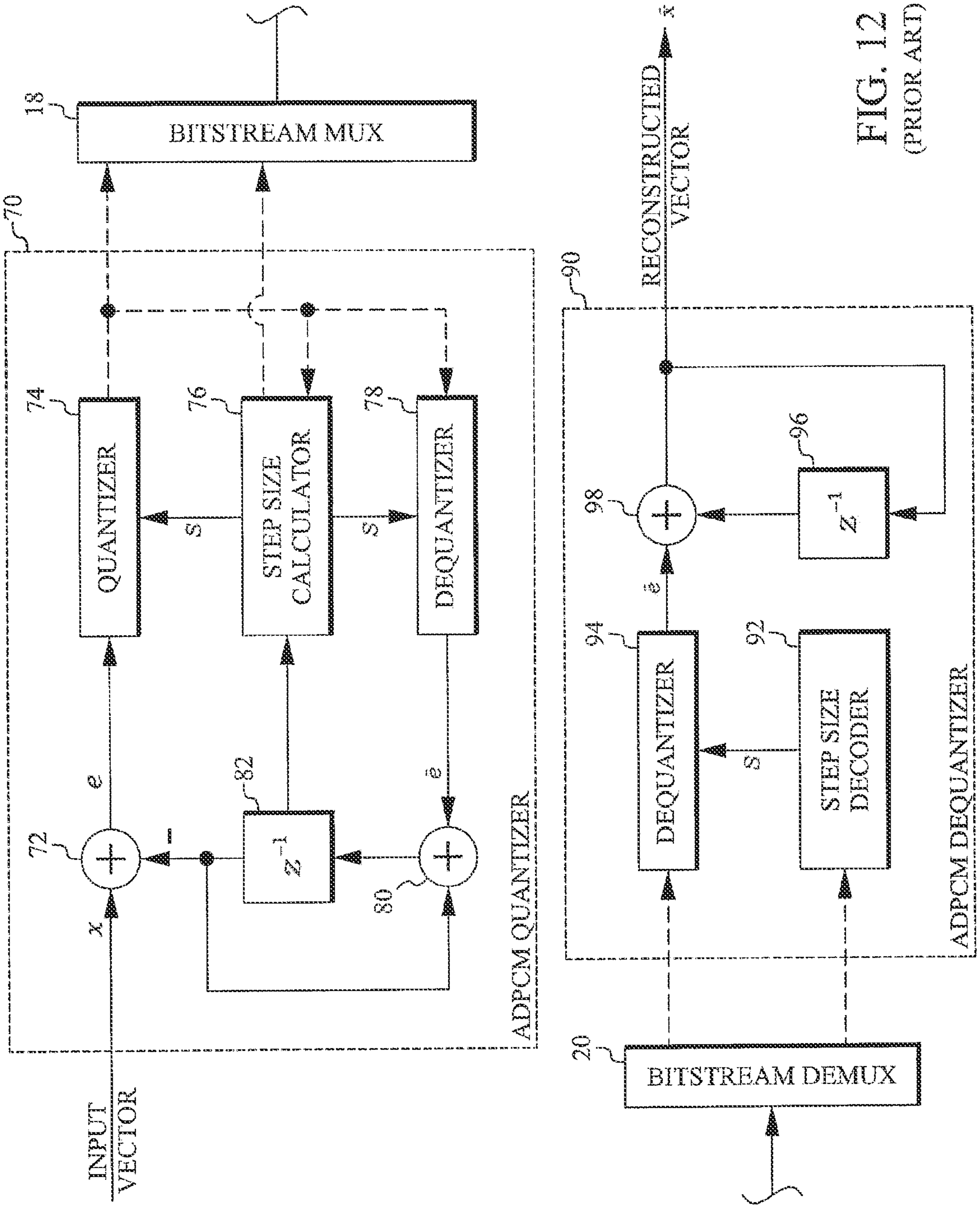
FIG. 12 (PRIOR ART)
FIG. 12 illustrates an example of an ADPCM encoder and decoder system with an adaptive step size.

In another example embodiment, the shape is quantized using a QMF (Quadrature Mirror Filter) filter bank and an ADPCM (Adaptive Differential Pulse-Code Modulation) scheme for shape quantization. An example of a subband ADPCM scheme is the ITU-T G.722 [4]. The input audio signal is preferably processed in segments. An example ADPCM scheme is shown in FIG. 12, with an adaptive step size S. Here, the adaptive step size of the shape quantizer serves as an accuracy measure that is already present in the decoder and does not require additional signaling. However, the quantization step size needs to be extracted from the parameters used by the decoding process and not from the synthesized shape itself. An overview of this embodiment is shown in FIG. 14. However, before this embodiment is described in detail, an example ADPCM scheme based on a QMF filter bank will be described with reference to FIGS. 12 and 13.

FIG. 12 illustrates an example of an ADPCM encoder and decoder system with an adaptive quantization step size. An ADPCM quantizer 70 includes an adder 72, which receives an input signal and subtracts an estimate of the previous input signal to form an error signal e. The error signal is quantized in a quantizer 74, the output of which is forwarded to the bitstream multiplexer 18, and also to a step size calculator 76 and a dequantizer 78. The step size calculator 76 adapts the quantization step size S to obtain an acceptable error. The quantization step size S is forwarded to the bitstream multiplexer 18, and also controls the quantizer 74 and the dequantizer 78. The dequantizer 78 outputs an error estimate ê to an adder 80. The other input of the adder 80 receives an estimate of the input signal which has been delayed by a delay element 82. This forms a current estimate of the input signal, which is forwarded to the delay element 82. The delayed signal is also forwarded to the step size calculator 76 and to (with a sign change) the adder 72 to form the error signal e.

An ADPCM dequantizer 90 includes a step size decoder 92, which decodes the received quantization step size S and forwards it to a dequantizer 94. The dequantizer 94 decodes the error estimate ê, which is forwarded to an adder 98, the other input of which receives the output signal from the adder delayed by a delay element 96.

Figure 13:
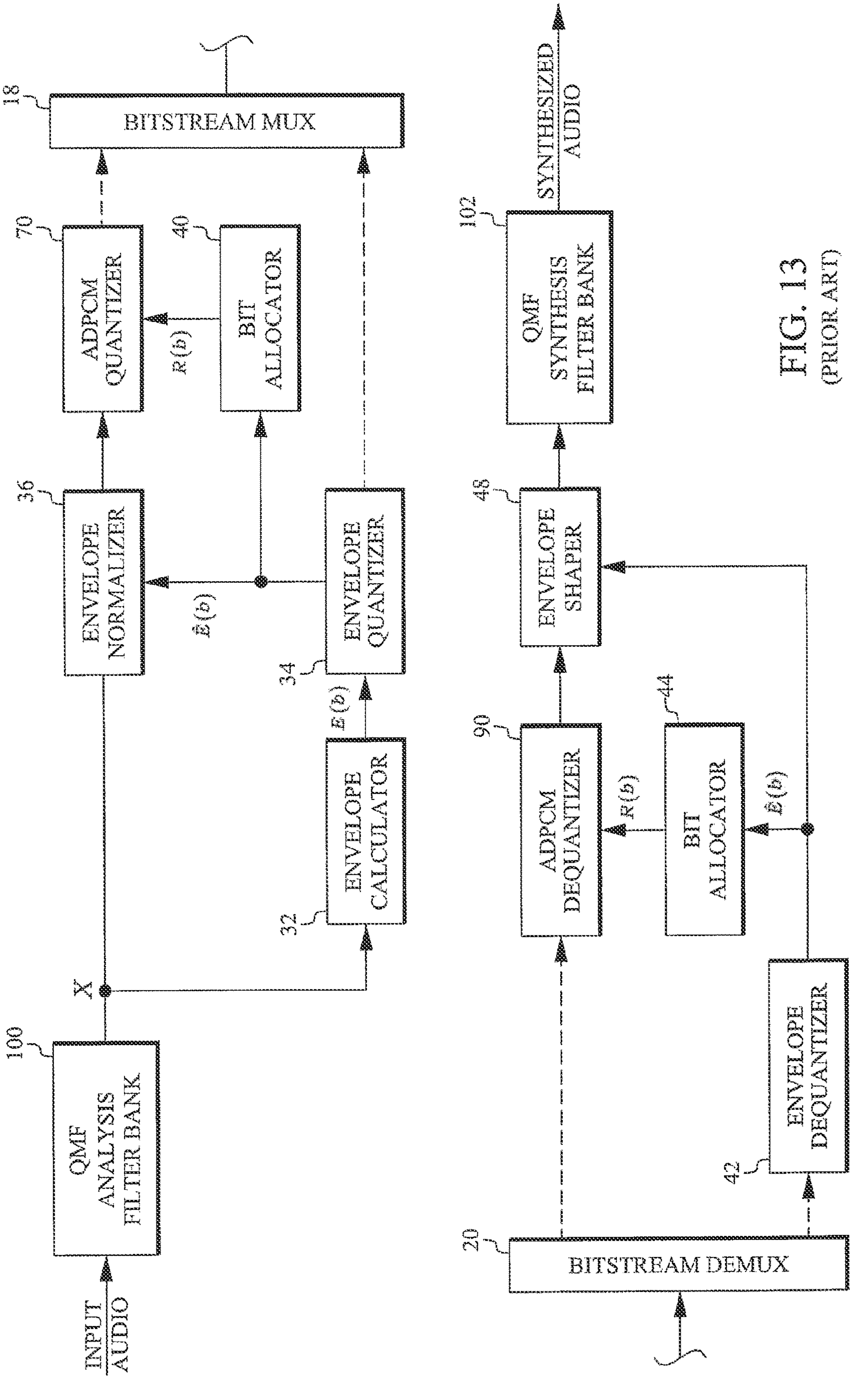
FIG. 13 (PRIOR ART)
FIG. 13 illustrates an example in the context of a subband ADPCM based audio coder and decoder system.
Figure 14:
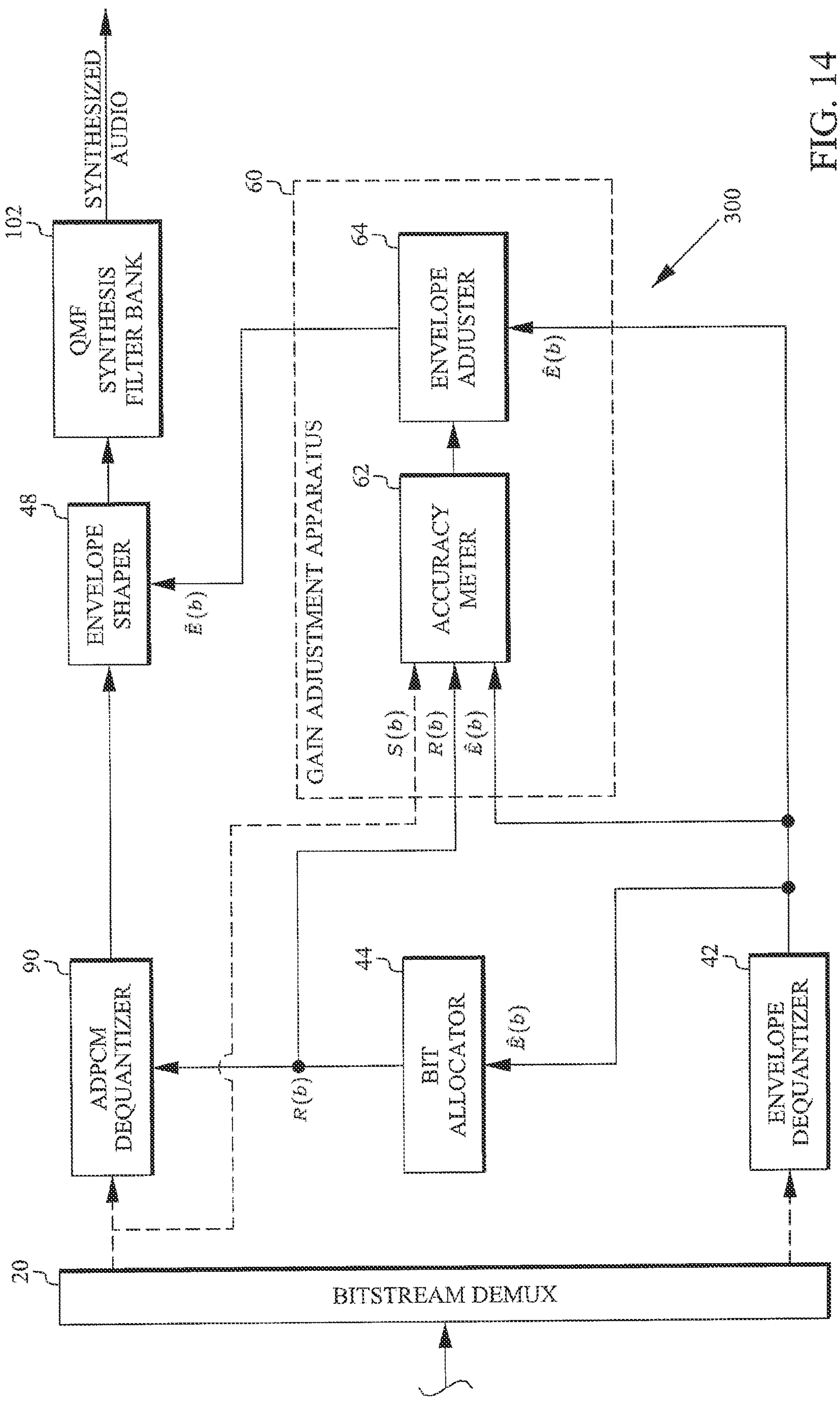
FIG. 14 illustrates an embodiment of the present technology in the context of a subband ADPCM based audio coder and decoder system.

FIG. 13 illustrates an example in the context of a subband ADPCM based audio encoder and decoder system. The encoder side is similar to the encoder side of the embodiment of FIG. 2. The essential differences are that the frequency transformer 30 has been replaced by a QMF (Quadrature Mirror Filter) analysis filter bank 100, and that fine structure quantizer 38 has been replaced by an ADPCM quantizer, such as the quantizer 70 in FIG. 12. The decoder side is similar to the decoder side of the embodiment of FIG. 2. The essential differences are that the inverse frequency transformer 50 has been replaced by a QMF synthesis filter bank 102, and that fine structure dequantizer 46 has been replaced by an ADPCM dequantizer, such as the dequantizer 90 in FIG. 12.

FIG. 14 illustrates an embodiment of the present technology in the context of a subband ADPCM based audio coder and decoder system. In order to avoid cluttering of the drawing, only the decoder side 300 is illustrated. The encoder side may be implemented as in FIG. 13.

Encoder of Embodiment 2

The encoder applies the QMF filter bank to obtain the subband signals. The RMS values of each subband signal are calculated and the subband signals are normalized. The envelope E(b), subband bit allocation R(b) and normalized shape vectors N(b) are obtained as in embodiment 1. Each normalized subband is fed to the ADPCM quantizer. In this embodiment the ADPCM operates in a forward adaptive fashion, and determines a scaling step S(b) to be used for subband b. The scaling step is chosen to minimize the MSE across the subband frame. In this embodiment the step is chosen by trying all possible steps and selecting the one which gives the minimum MSE:

$$S(b) = \min_s \frac{1}{BW(b)} (N(b) - Q(N(b), s))^T (N(b) - Q(N(b), s)) \tag{22}$$

where Q(x,s) is the ADPCM quantizing function of the variable x using a step size of s. The selected step size may be used to generate the quantized shape:

$$\hat{N}(b) = Q(N(b), S(b)) \tag{23}$$

The quantizer indices from the envelope quantization and shape quantization are multiplexed into a bitstream to be stored or transmitted to a decoder.

Decoder of Embodiment 2

The decoder demultiplexes the indices from the bitstream and forwards the relevant indices to each decoding module. The quantized envelope Ê(b) and the bit allocation R(b) are obtained as in embodiment 1. The synthesized shape vectors N̂(b) are obtained from the ADPCM decoder or dequantizer together with the adaptive step sizes S(b). The step sizes indicate an accuracy of the quantized shape vector, where a smaller step size corresponds to a higher accuracy and vice versa. One possible implementation is to make the accuracy A(b) inversely proportional to the step size using a proportionality factor γ:

$$A(b) = \gamma \frac{1}{S(b)} \tag{24}$$

where γ should be set to achieve the desired relation. One possible choice is $\gamma = S_{min}$ where $S_{min}$ is the minimum step size, which gives accuracy 1 for $S(b) = S_{min}$.

The gain correction factor $g_c$ may be obtained using a mapping function:

$$g_c(b) = h(R(b), b) \cdot A(b) \tag{25}$$

The mapping function h may be implemented as a lookup table based on the rate R(b) and frequency band b. This table may be defined by clustering the optimal gain correction values $g_{MSE}/g_{RMS}$ by these parameters and computing the table entry by averaging the optimal gain correction values for each cluster.

After the estimation of the gain correction, the subband synthesis X̂(b) is calculated as:

$$\hat{X}(b) = \underbrace{g_c(b) g_{RMS}(b) \hat{E}(n)}_{\tilde{E}(n)} \hat{N}(b) \tag{26}$$

The output audio frame is obtained by applying the synthesis QMF filter bank to the subbands.

In the example embodiment illustrated in FIG. 14 the accuracy meter 62 in the gain adjustment apparatus 60 receives the not yet decoded quantization step size S(b) directly from the received bitstream. An alternative, as noted above, is to decode it in the ADPCM dequantizer 90 and forward it in decoded form to the accuracy meter 62.

Further Alternatives

Figure 15:
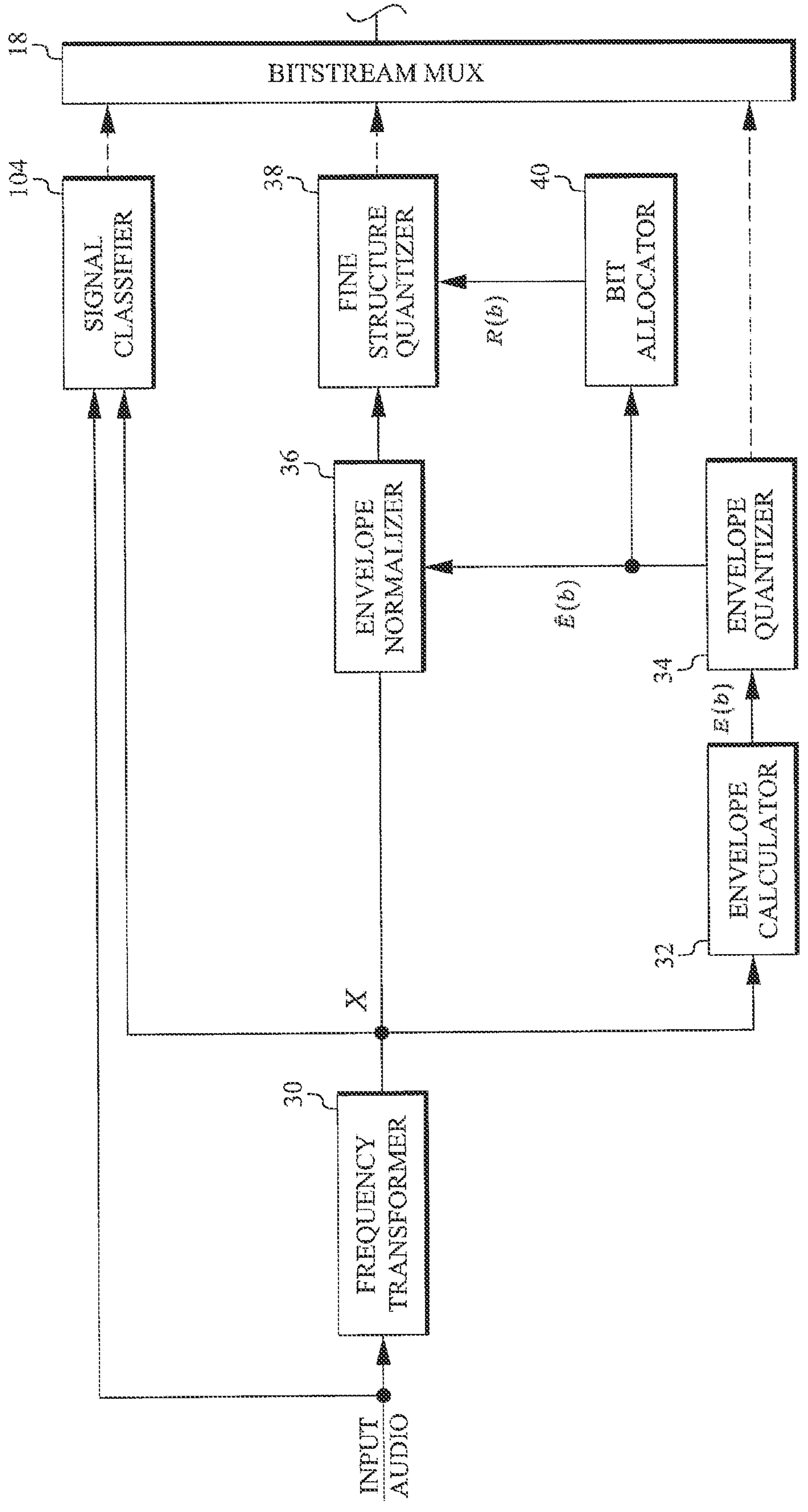
FIG. 15 illustrates an example transform domain encoder including a signal classifier.
Figure 16:
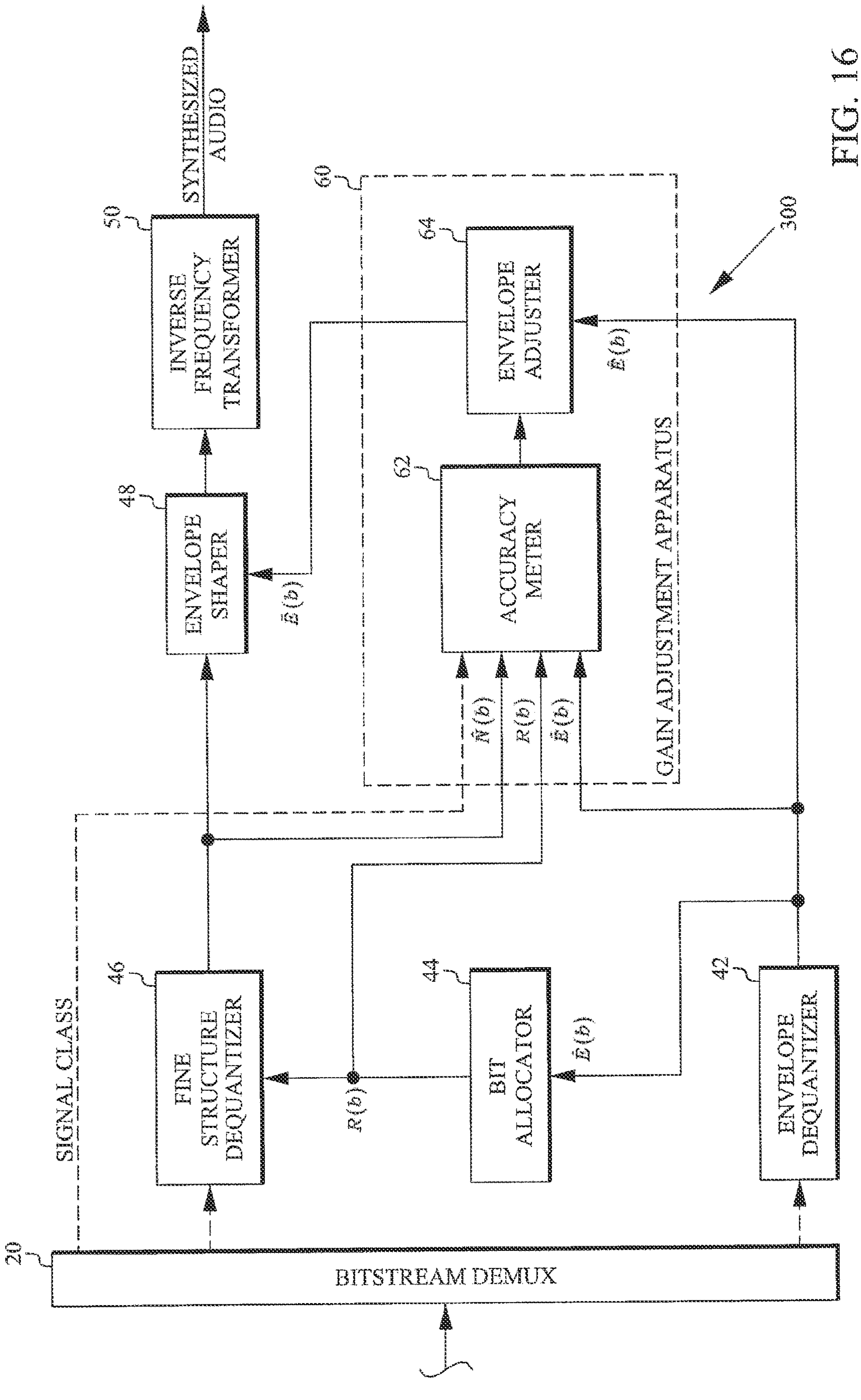
FIG. 16 illustrates another example transform domain decoder using an accuracy measure to determine an envelope correction.

The accuracy measure could be complemented with a signal class parameter derived in the encoder. This may for instance be a speech/music discriminator or a background noise level estimator. An overview of a system incorporating a signal classifier is shown in FIG. 15-16. The encoder side in FIG. 15 is similar to the encoder side in FIG. 2, but has been provided with a signal classifier 104. The decoder side 300 in FIG. 16 is similar to the decoder side in FIG. 4, but has been provided with a further signal class input to the accuracy meter 62.

The signal class could be incorporated in the gain correction for instance by having a class dependent adaptation. If we assume the signal classes are speech or music corresponding to the values C=1 and C=0 respectively, we can constrain the gain adjustment to be effective only during speech, i.e.:

$$g_c(b) = \begin{cases} t(R(b)) \cdot A(b), & b < b_{THR} \wedge C = 1 \\ 1, & \text{otherwise} \end{cases} \tag{27}$$

In another alternative embodiment the system can act as a predictor together with a partially coded gain correction or compensation. In this embodiment the accuracy measure is used to improve the prediction of the gain correction or compensation such that the remaining gain error may be coded with fewer bits.

When creating the gain correction or compensation factor $g_c$ one might want to do a trade-off between matching the RMS value or energy and minimizing the MSE. In some cases matching the energy becomes more important than an accurate waveform. This is for instance true for higher frequencies. To accommodate this, the final gain correction may, in a further embodiment, be formed by using a weighted sum of the different gain values:

$$g_c' = \frac{\beta g_{RMS} + (1-\beta) g_{MSE}}{g_{RMS}} = \beta + (1-\beta)\frac{g_{MSE}}{g_{RMS}}\beta + (1-\beta) g_c \tag{28}$$

where $g_c$ is the gain correction obtained in accordance with one of the approaches described above. The weighting factor β can be made adaptive to e.g. the frequency, bitrate or signal type.

The steps, functions, procedures and/or blocks described herein may be implemented in hardware using any conventional technology, such as discrete circuit or integrated circuit technology, including both general-purpose electronic circuitry and application-specific circuitry.

Alternatively, at least some of the steps, functions, procedures and/or blocks described herein may be implemented in software for execution by a suitable processing device, such as a micro processor, Digital Signal Processor (DSP) and/or any suitable programmable logic device, such as a Field Programmable Gate Array (FPGA) device.

It should also be understood that it may be possible to reuse the general processing capabilities of the decoder. This may, for example, be done by reprogramming of the existing software or by adding new software components.

Figure 17:
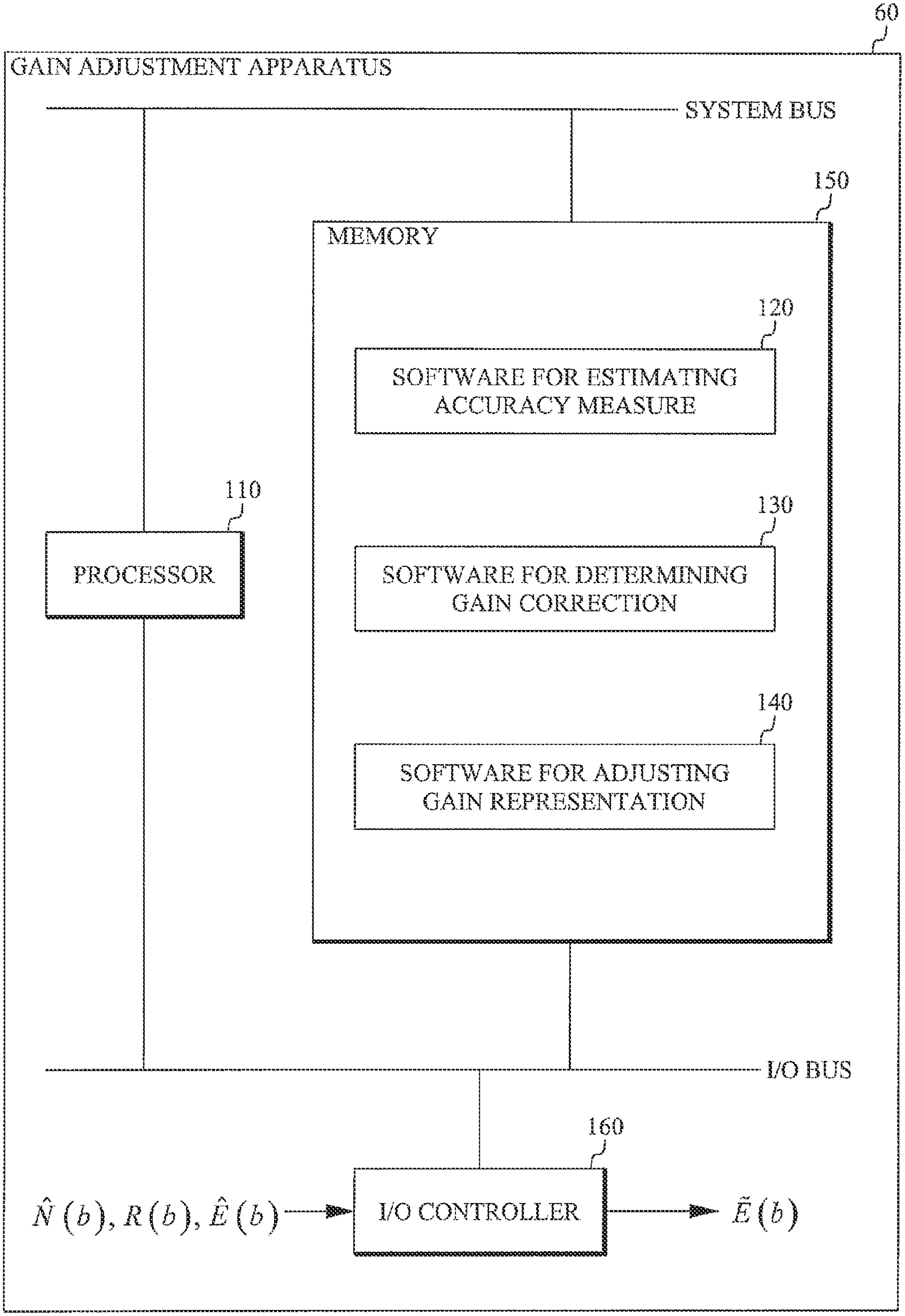
FIG. 17 illustrates an embodiment of a gain adjustment apparatus in accordance with the present technology.

FIG. 17 illustrates an embodiment of a gain adjustment apparatus 60 in accordance with the present technology. This embodiment is based on a processor 110, for example a micro processor, which executes a software component 120 for estimating the accuracy measure, a software component 130 for determining gain the correction, and a soft-ware component 140 for adjusting the gain representation. These software components are stored in memory 150. The processor 110 communicates with the memory over a system bus. The parameters N̂(b), R(b), Ê(b) are received by an input/output (I/O) controller 160 controlling an I/O bus, to which the processor 110 and the memory 150 are connected. In this embodiment the parameters received by the I/O controller 160 are stored in the memory 150, where they are processed by the software components. Software components 120, 130 may implement the functionality of block 62 in the embodiments described above. Software component 140 may implement the functionality of block 64 in the embodiments described above. The adjusted gain representation Ẽ(b) obtained from software component 140 is outputted from the memory 150 by the I/O controller 160 over the I/O bus.

Figure 18:
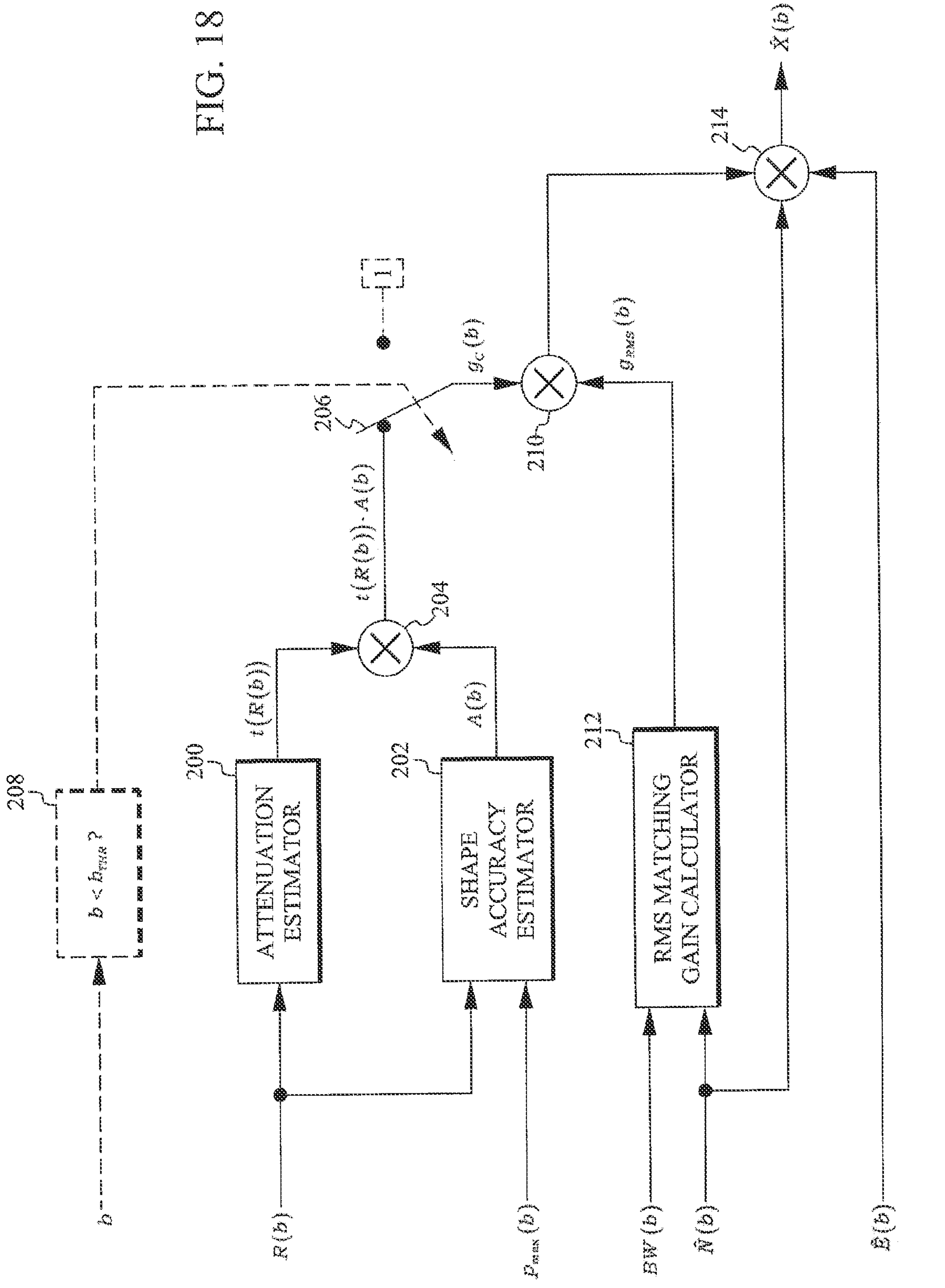
FIG. 18 illustrates an embodiment of gain adjustment in accordance with the present technology in more detail.

FIG. 18 illustrates an embodiment of gain adjustment in accordance with the present technology in more detail. An attenuation estimator 200 is configured to use the received bit allocation R(b) to determine a gain attenuation t(R(b)). The attenuation estimator 200 may, for example, be implemented as a lookup table or in software based on a linear equation such as equation (14) above. The bit allocation R(b) is also forwarded to a shape accuracy estimator 202, which also receives an estimated sparseness $p_{max}$ (b) of the quantized shape, for example represented by the height of the highest pulse in the shape representation R(b). The shape accuracy estimator 202 may, for example, be implemented as a lookup table. The estimated attenuation t(R(b)) and the estimated shape accuracy A(b) are multiplied in a multiplier 204. In one embodiment this product t(R(b))·A(b) directly forms the gain correction $g_c$(b). In another embodiment the gain correction $g_c$(b) is formed in accordance with equation (12) above. This requires a switch 206 controlled by a comparator 208, which determines whether the frequency band b is less than a frequency limit $b_{THR}$. If this is the case, then $g_c$(b) is equal to t(R(b))·A(b). Otherwise $g_c$(b) is set to 1. The gain correction $g_c$(b) is forwarded to another multiplier 210, the other input of which receives the RMS matching gain $g_{RMS}$ (b). The RMS matching gain $g_{RMS}$ (b) is determined by an RMS matching gain calculator 212 based on the received shape representation N̂(b) and corresponding bandwidth BW(b), see equation (4) above. The resulting product is forwarded to another multiplier 214, which also receives the shape representation N̂(b) and the gain representation Ê(b), and forms the synthesis X̂(b).

Figure 10:
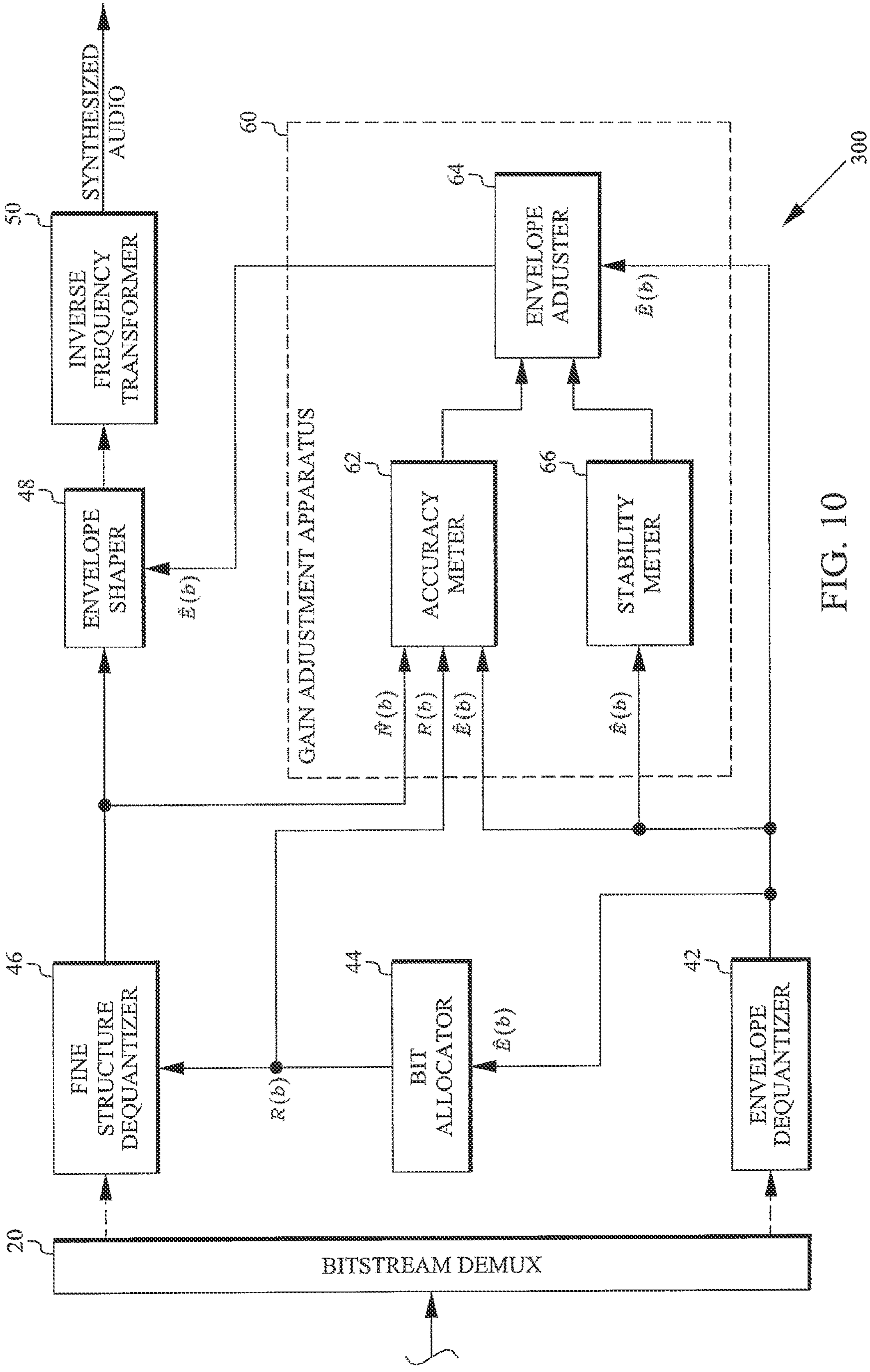
FIG. 10 illustrates an embodiment of the present technology in the context of an MDCT based audio coder and decoder system.

The stability detection described with reference to FIG. 10 may be incorporated into embodiment 2 as well as the other embodiments described above.

Figure 19:
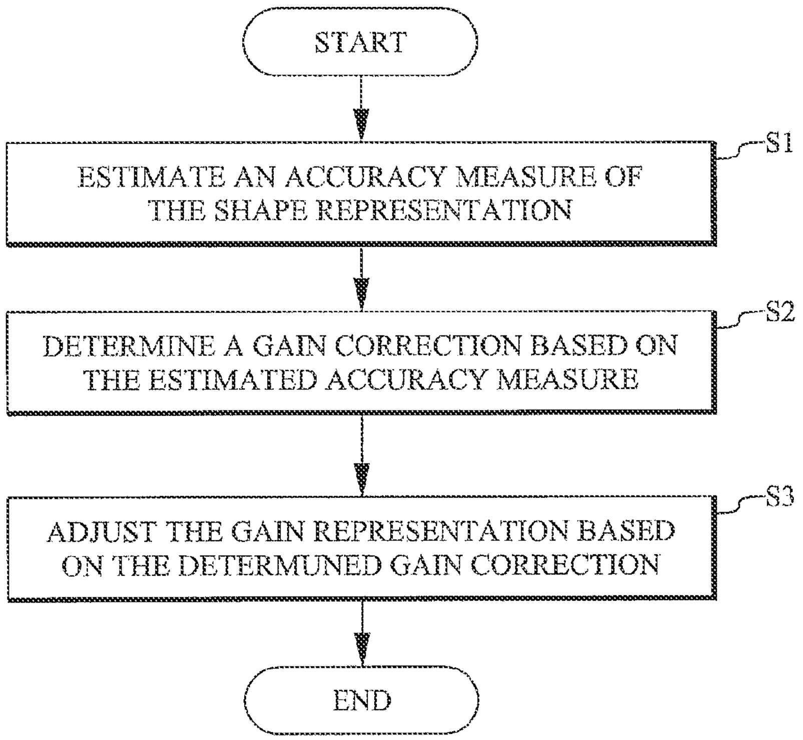
FIG. 19 is a flow chart illustrating the method in accordance with the present technology.

FIG. 19 is a flow chart illustrating the method in accordance with the present technology. Step S1 estimates an accuracy measure A(b) of the shape representation $\hat{N}(b)$. The accuracy measure may, for example, be derived from shape quantization characteristics, such as R(b), S(b), indicating the resolution of the shape quantization. Step S2 determines a gain correction, such as $g_C(b)$, $\tilde{g}_C(b)$, $g'_C(b)$, based on the estimated accuracy measure. Step S3 adjusts the gain representation $\hat{E}(b)$ based on the determined gain correction.

Figure 20:
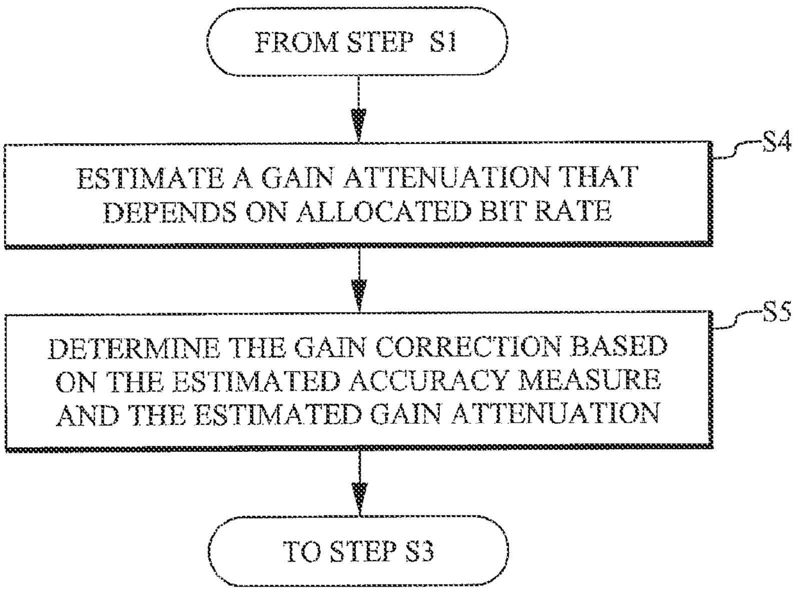
FIG. 20 is a flow chart illustrating an embodiment of the method in accordance with the present technology.

FIG. 20 is a flow chart illustrating an embodiment of the method in accordance with the present technology, in which the shape has been encoded using a pulse coding scheme and the gain correction depends on an estimated sparseness $p_{max}(b)$ of the quantized shape. It is assumed that an accuracy measure has already been determined at step S1 (FIG. 19). Step S4 estimates a gain attenuation that depends on allocated bit rate. Step S5 determines a gain correction based on the estimated accuracy measure and the estimated gain attenuation. Thereafter the procedure proceeds to step S3 (FIG. 19) to adjust the gain representation.

Figure 21:
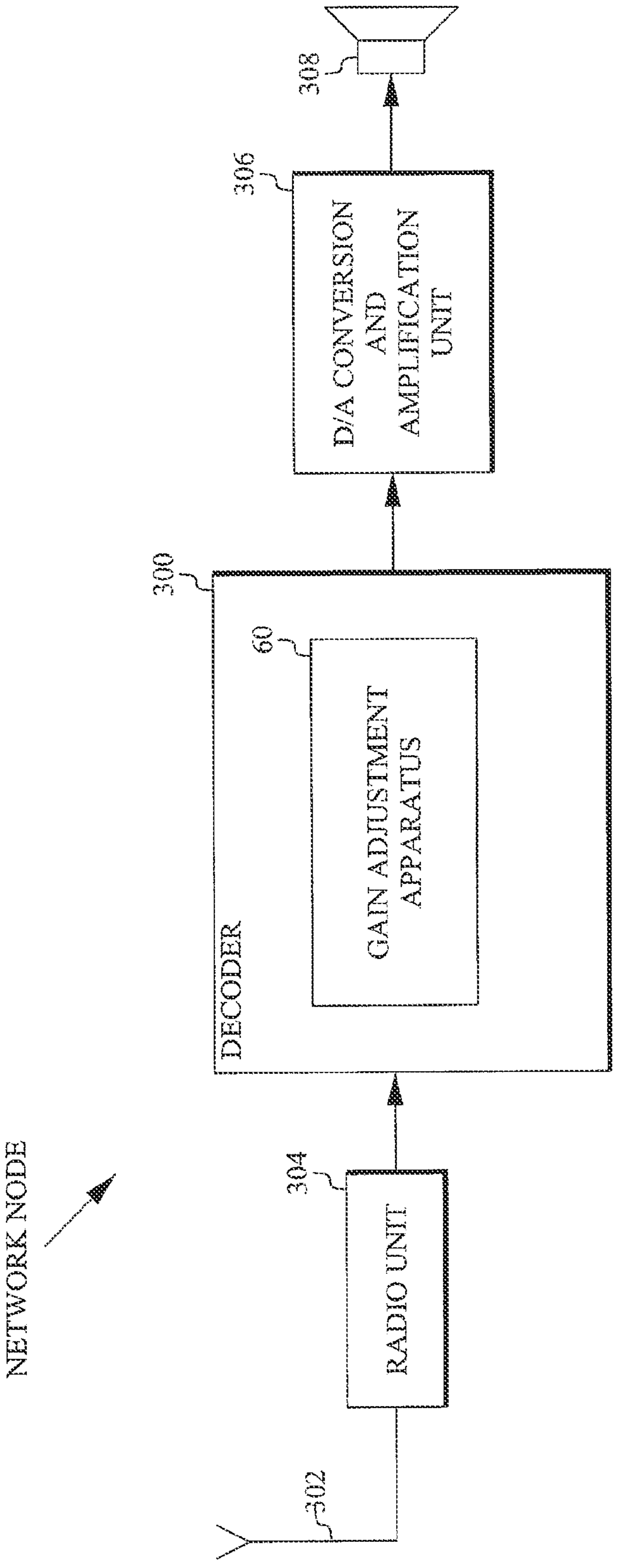
FIG. 21 illustrates an embodiment of a network in accordance with the present technology.

FIG. 21 illustrates an embodiment of a network in accordance with the present technology. It includes a decoder 300 provided with a gain adjustment apparatus in accordance with the present technology. This embodiment illustrates a radio terminal, but other network nodes are also feasible. For example, if voice over IP (Internet Protocol) is used in the network, the nodes may comprise computers.

In the network node in FIG. 21 an antenna 302 receives a coded audio signal. A radio unit 304 transforms this signal into audio parameters, which are forwarded to the decoder 300 for generating a digital audio signal, as described with reference to the various embodiments above. The digital audio signal is then D/A converted and amplified in a unit 306 and finally forwarded to a loudspeaker 308.

Although the description above focuses on transform based audio coding, the same principles may also be applied to time domain audio coding with separate gain and shape representations, for example CELP coding.

It will be understood by those skilled in the art that various modifications and changes may be made to the present technology without departure from the scope thereof, which is defined by the appended claims.

ABBREVIATIONS

ADPCM Adaptive Differential Pulse-Code Modulation
AMR Adaptive MultiRate
AMR-WB Adaptive MultiRate WideBand
CELP Code Excited Linear Prediction
GSM-EFR Global System for Mobile communications-Enhanced FullRate
DSP Digital Signal Processor
FPGA Field Programmable Gate Array
IP Internet Protocol
MDCT Modified Discrete Cosine Transform
MSE Mean Squared Error
QMF Quadrature Mirror Filter
RMS Root-Mean-Square
VQ Vector Quantization

REFERENCES

[1] "ITU-T G.722.1 ANNEX C: A NEW LOW-COMPLEXITY 14 KHZ AUDIO CODING STANDARD", ICASSP 2006.

[2] "ITU-T G.719: A NEW LOW-COMPLEXITY FULL-BAND (20 KHZ) AUDIO CODING STANDARD FOR HIGH-QUALITY CONVERSATIONAL APPLICATIONS", WASPA 2009.

[3]. Mittal. J. Ashley, E. Cruz-Zeno, "Low Complexity Factorial Pulse Coding of MDCT Coefficients using Approximation of Combinatorial Functions," ICASSP 2007.

[4] "7 kHz Audio Coding Within 64 kbit/s", [G.722], IEEE JOURNAL ON SELECTED AREAS IN COMMUNICATIONS, 1988.

What is claimed is:

1. A method of correcting gain errors arising in audio encoding, the method performed by a processing circuit and comprising:

receiving gain representations and shape representations encoding frequency domain transform coefficients corresponding to an input audio signal, the shape representations being quantized shape vectors representing spectral detail of the audio signal and the gain representations representing a spectral envelope of the input audio signal;

determining scaling factors to compensate for mismatches between the gain representations and the shape representations, the mismatches arising from the quantization of the shape vectors during encoding;

scaling the gain representations according to the scaling factors, to obtain scaled gain representations that are compensated for the mismatches between the gain representations and the shape representations;

outputting the shape representations and the scaled gain representations, for synthesizing an output audio signal; and synthesizing the output audio signal from the scaled gain representations and the shape representations.

2. The method of claim 1, wherein determining the scaling factors comprises determining the scaling factors according to a lookup table that is indexed according to bit rate, such that determining the scaling factor for each gain representation comprises determining a bit rate used for encoding a corresponding one of the shape representations and indexing into the lookup table according to the determined bit rate.

3. The method of claim 2, the lookup table is further indexed by frequency bandwidth, such that, for a given shape representation, there are different scaling factors for the corresponding gain representation, in dependence on a frequency bandwidth associated with the given shape representation.

4. The method of claim 1, wherein determining the scaling factors comprises determining the scaling factors according to a lookup table that is indexed according to sparseness, such that determining the scaling factor for each gain representation comprises estimating sparseness for a corresponding one of the shape representations and indexing into the lookup table according to the estimated sparseness.

5. The method of claim 1, wherein each shape representation corresponds to a respective one of the gain representations, and wherein scaling the gain representations comprises scaling each gain representation in dependence on an accuracy measure estimated for the corresponding shape representation.

6. The method of claim 5, wherein estimating the accuracy measure for each shape representation comprises estimating the accuracy measure according to the number of bits allocated for quantizing the shape vector represented by the shape representation.

7. The method of claim 5, wherein estimating the accuracy measure for each shape representation comprises determining a sparseness of the shape representation and estimating the accuracy measure according to the sparseness.

8. The method of claim 7, wherein determining the sparseness of each shape representation comprises estimating the sparseness of each shape representation based on a maximum peak height in each shape representation.

9. A processing circuit configured to correct gain errors arising in audio encoding, the processing circuit comprising:
- input/output (I/O) circuitry configured to receive gain representations and shape representations encoding frequency domain transform coefficients corresponding to an input audio signal, the shape representations being quantized shape vectors representing spectral detail of the audio signal and the gain representations representing a spectral envelope of the input audio signal; and
- a processor configured to:
  - determine scaling factors to compensate for mismatches between the gain representations and the shape representations, the mismatches arising from the quantization of the shape vectors during encoding;
  - scale the gain representations according to the scaling factors, to obtain scaled gain representations that are compensated for the mismatches between the gain representations and the shape representations;
  - output the shape representations and the scaled gain representations, for synthesizing an output audio signal; and
  - synthesize the output audio signal from the scaled gain representations and the shape representations.

10. The processing circuit of claim 9, wherein the processor is configured to determine the scaling factors according to a lookup table that is indexed according to bit rate, such that determining the scaling factor for each gain representation comprises determining a bit rate used for encoding a corresponding one of the shape representations and indexing into the lookup table according to the determined bit rate.

11. The processing circuit of claim 10, the lookup table is further indexed by frequency bandwidth, such that, for a given shape representation, there are different scaling factors for the corresponding gain representation, in dependence on a frequency bandwidth associated with the given shape representation.

12. The processing circuit of claim 9, wherein the processor is configured to determine the scaling factors according to a lookup table that is indexed according to sparseness, such that determining the scaling factor for each gain representation comprises estimating sparseness for a corresponding one of the shape representations and indexing into the lookup table according to the estimated sparseness.

13. The processing circuit of claim 9, wherein each shape representation corresponds to a respective one of the gain representations, and wherein the processor is configured to scale each gain representation in dependence on an accuracy measure estimated for the corresponding shape representation.

14. The processing circuit of claim 13, wherein the processor is configured to estimate the accuracy measure for each shape representation according to the number of bits allocated for quantizing the shape vector represented by the shape representation.

15. The processing circuit of claim 13, wherein the processor is configured to estimate the accuracy measure for each shape representation by determining a sparseness of the shape representation and estimating the accuracy measure according to the sparseness.

16. The processing circuit of claim 13, wherein the processor is configured to estimate the sparseness of each shape representation based on a maximum peak height in each shape representation.

* * * * *